(12) United States Patent
Seo et al.

(10) Patent No.: US 9,504,033 B2
(45) Date of Patent: Nov. 22, 2016

(54) METHOD AND APPARATUS FOR ALLOCATING CHANNELS RELATED TO UPLINK BUNDLING

(71) Applicant: LG ELECTRONICS INC., Seoul (KR)

(72) Inventors: Daewon Seo, Anyang-si (KR);
Suckchel Yang, Anyang-si (KR);
Seungmin Lee, Anyang-si (KR);
Hakseong Kim, Anyang-si (KR);
Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 41 days.

(21) Appl. No.: 14/364,291

(22) PCT Filed: Jan. 7, 2013

(86) PCT No.: PCT/KR2013/000105
§ 371 (c)(1),
(2) Date: Jun. 10, 2014

(87) PCT Pub. No.: WO2013/103280
PCT Pub. Date: Jul. 11, 2013

(65) Prior Publication Data
US 2014/0362796 A1  Dec. 11, 2014

Related U.S. Application Data

(60) Provisional application No. 61/583,616, filed on Jan. 6, 2012.

(51) Int. Cl.
*H04W 72/04* (2009.01)
*H04L 1/18* (2006.01)
(Continued)

(52) U.S. Cl.
CPC ........ *H04W 72/0446* (2013.01); *H04L 1/1854* (2013.01); *H04W 72/1273* (2013.01); *H04W 28/06* (2013.01); *H04W 72/042* (2013.01)

(58) Field of Classification Search
None
See application file for complete search history.

(56) References Cited

U.S. PATENT DOCUMENTS

| 2009/0285122 A1 | 11/2009 | Onggosanusi et al. |
| 2010/0169732 A1* | 7/2010 | Wu ............................... 714/748 |
| 2012/0184314 A1* | 7/2012 | Malladi et al. ............... 455/509 |

FOREIGN PATENT DOCUMENTS

| CN | 101223795 | 7/2008 |
| CN | 101499894 | 8/2009 |

(Continued)

OTHER PUBLICATIONS

PCT International Application No. PCT/KR2013/000105, Written Opinion of the International Searching Authority dated Apr. 22, 2013, 15 pages.

(Continued)

*Primary Examiner* — Khaled Kassim
*Assistant Examiner* — Zhaohui Yang
(74) *Attorney, Agent, or Firm* — Lee Hong Degerman Kang & Waimey; Jonathan Kang; Jeffrey Lotspeich

(57) ABSTRACT

A new PHICH channel and a new PDCCH channel are allocated when the location of a subframe to be used in transmission changes by the change in the configuration of the subframe caused by a dynamic uplink/downlink configuration in a subframe bundling transmission mode. In the event that a subframe is successfully transmitted in a subframe bundling mode, the location of the subframe that has been successfully transmitted is determined as a reference in determining the point of time of the response to the bundling transmission. In addition, the bundling transmission following the subframe that has been successfully transmitted can be omitted.

15 Claims, 20 Drawing Sheets

(51) Int. Cl.
*H04W 72/12* (2009.01)
*H04W 28/06* (2009.01)

(56) References Cited

FOREIGN PATENT DOCUMENTS

| | | |
|---|---|---|
| CN | 101795183 | 8/2010 |
| KR | 10-2010-0002114 | 1/2010 |
| KR | 10-2010-0021475 | 2/2010 |
| KR | 10-2010-0139062 | 12/2010 |
| KR | 10-2011-0055014 | 5/2011 |

OTHER PUBLICATIONS

3rd Generation Partnership Project (3GPP), "Technical Specification Group Radio Access Network; Evolved Universal Terrestrial Radio Access (E-UTRA); Medium Access Control (MAC) protocol specification (Release 9)," 3GPP TS 36.321 V9.3.0, Jun. 2010, 48 pages.

PCT International Application No. PCT/KR2013/000105, Written Opinion of the International Searching Authority dated Apr. 22, 2013, 11 pages.

* cited by examiner

FIG. 9

FIG. 15
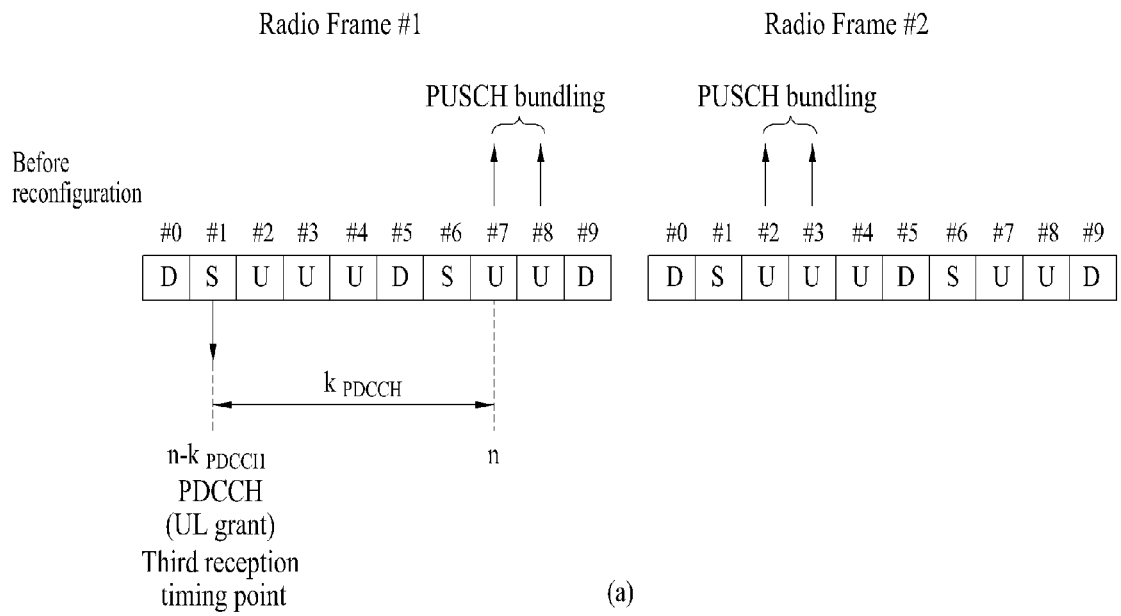
(a)
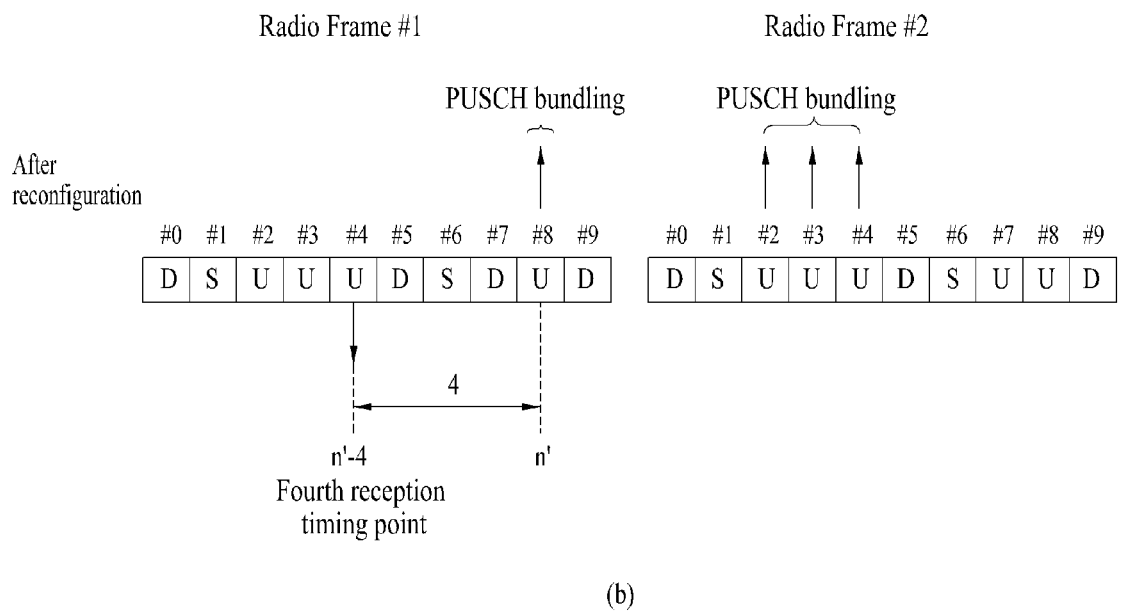
(b)

FIG. 16
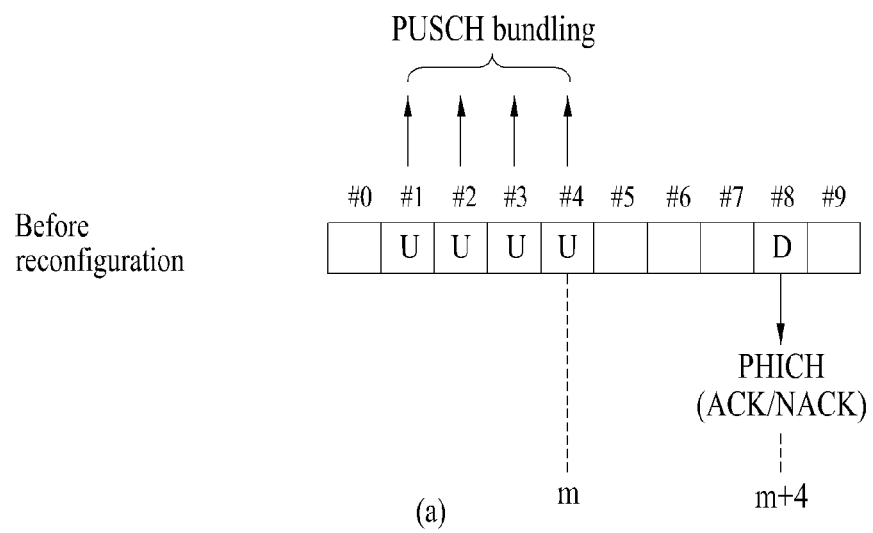
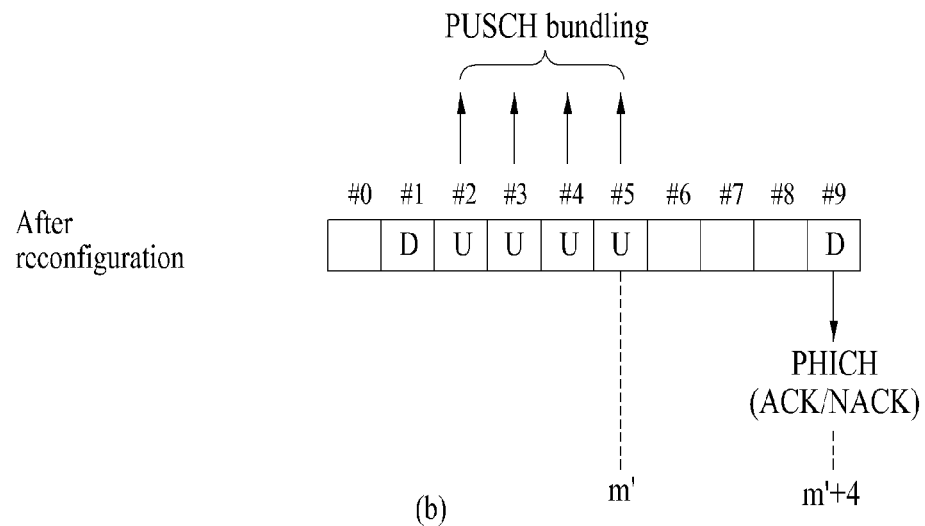

FIG. 17
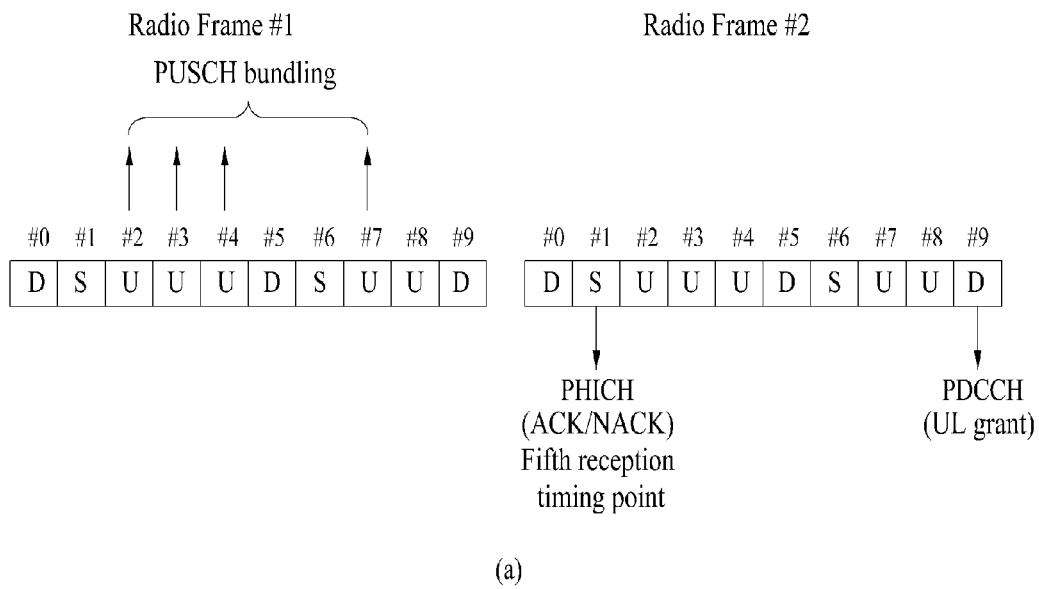
(a)
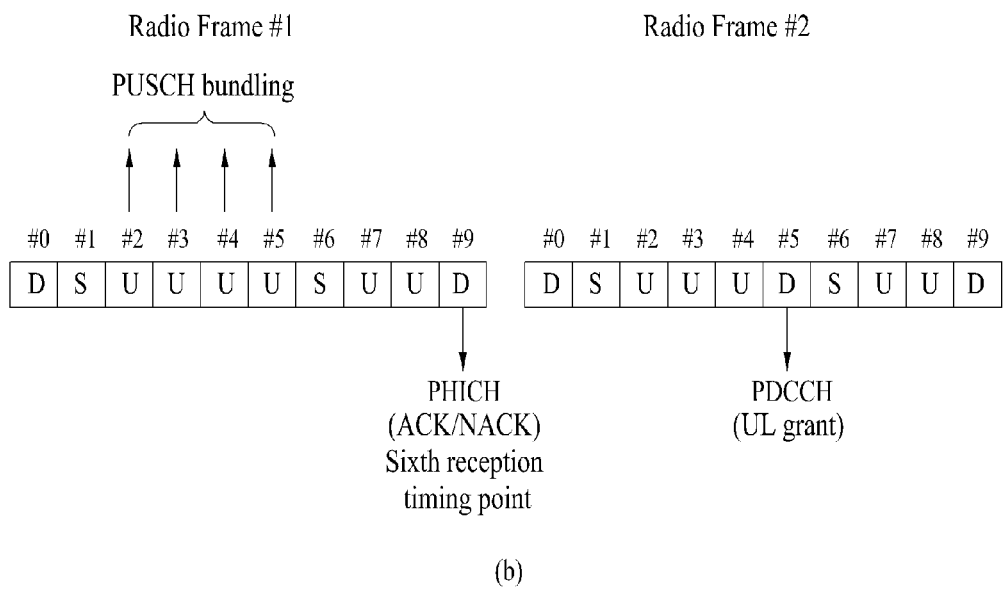
(b)

FIG. 18
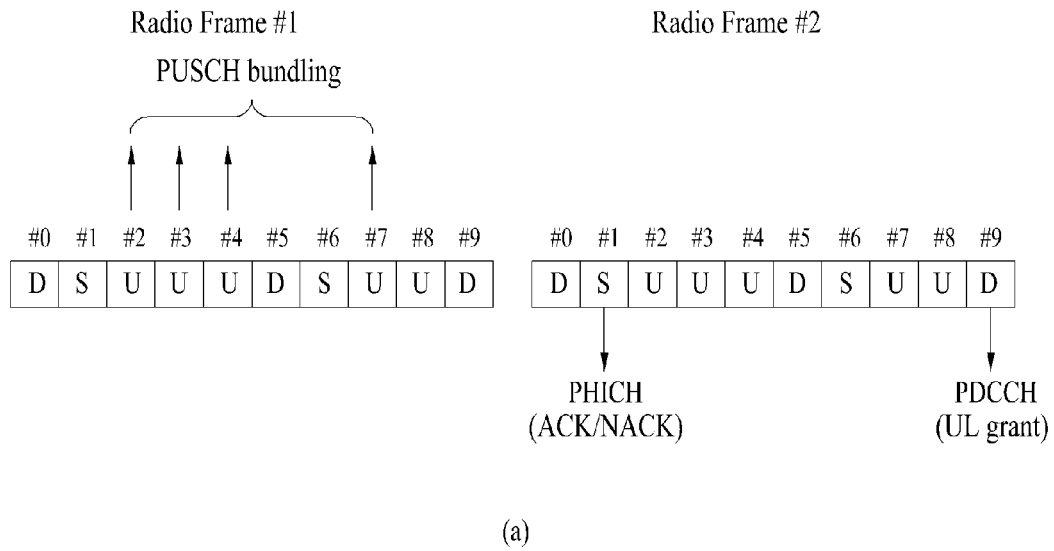
(a)
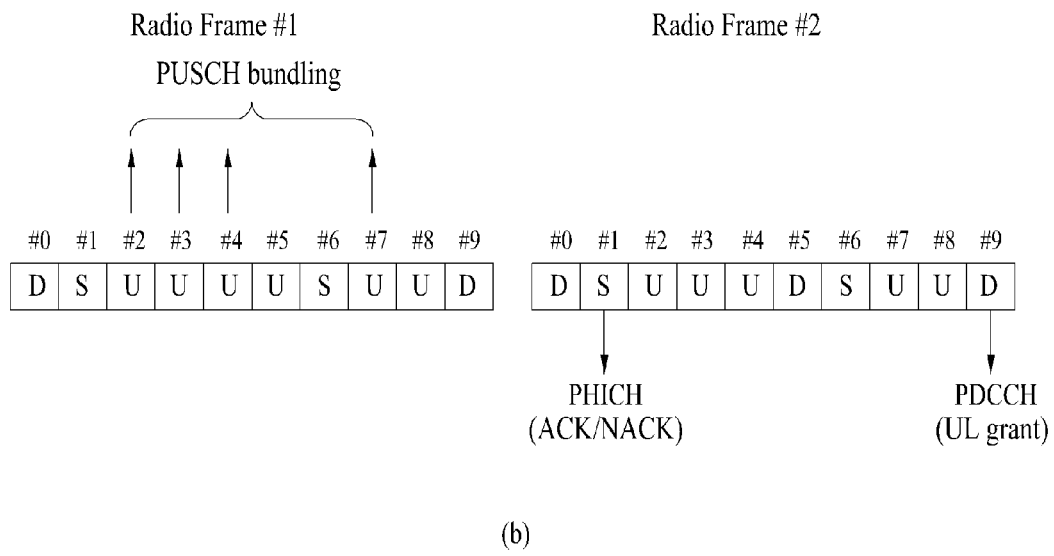
(b)

FIG. 19
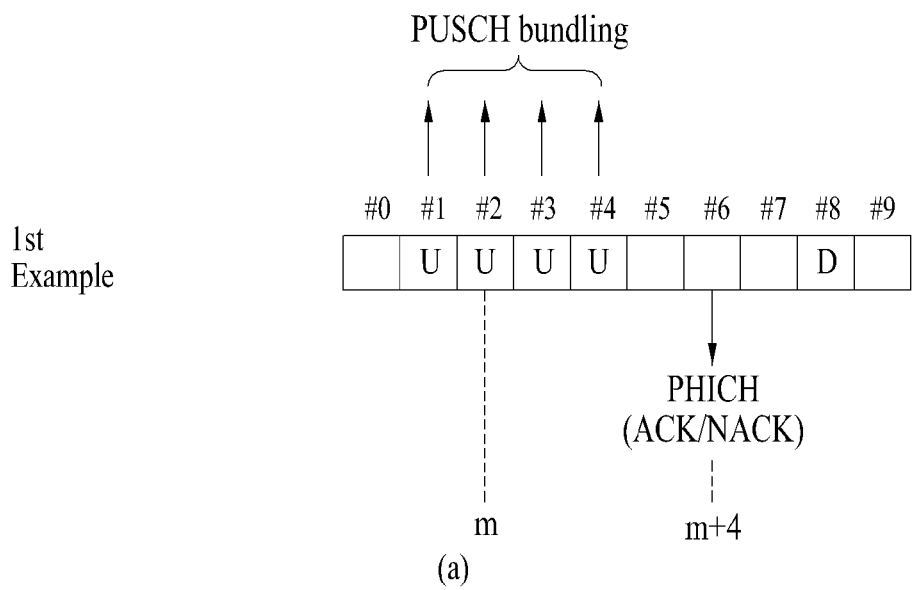
(a)
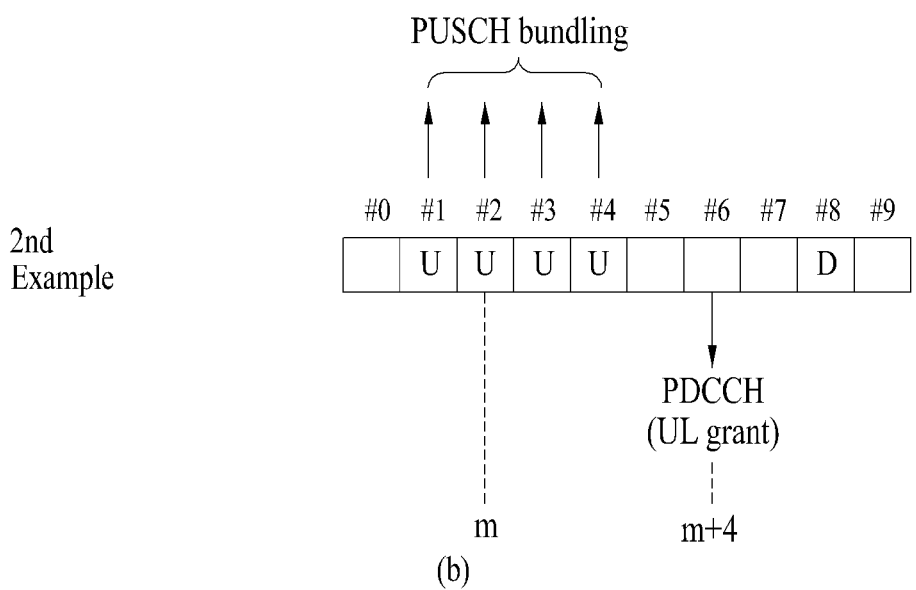
(b)

METHOD AND APPARATUS FOR ALLOCATING CHANNELS RELATED TO UPLINK BUNDLING

CROSS-REFERENCE TO RELATED APPLICATIONS

This application is the National Stage filing under 35 U.S.C. 371 of International Application No. PCT/KR2013/000105, filed on Jan. 7, 2013, which claims the benefit of U.S. Provisional Application Ser. No. 61/583,616, filed on Jan. 6, 2012, the contents of which are all hereby incorporated by reference herein in their entirety.

TECHNICAL FIELD

The present invention relates to a wireless communication system and, more specifically, to a method and apparatus for allocating channels related to uplink bundling in a wireless communication system.

BACKGROUND ART

In a wireless communication system, user equipment may receive information from a base station through downlink, and transmit information through uplink. The information transmitted or received by the user equipment may include data and various kinds of control information. According to the type and purpose of the information transmitted or received by the user equipment, there exist diverse physical channels.

In the wireless communication system, data is transmitted using a time resource and a frequency resource. Particularly, the time resource is divided into frame units to be used. Depending upon the type of the wireless communication system, the time resource is used after configuration of uplink/downlink is determined for each subframe.

Recently, research has been conducted on dynamic uplink/downlink configuration of using the uplink/downlink configuration by momentarily changing the uplink/downlink configuration even if the uplink/downlink configuration for a subframe has been determined. If the dynamic uplink/downlink configuration is used, efficient utilization of the resources may be possible. Accordingly, research has been conducted on application of the dynamic uplink/downlink configuration in various transmission modes.

DISCLOSURE

Technical Problem

An object of the present invention devised to solve the problem lies in a method for utilizing a dynamic uplink/downlink configuration in a subframe bundling transmission mode.

It is to be understood that technical objects to be achieved by the present invention are not limited to the aforementioned object and other technical objects which are not mentioned herein will be apparent from the following description to one of ordinary skill in the art to which the present invention pertains.

Technical Solution

The object of the present invention can be achieved by providing a method for transmitting uplink data using subframe bundling of transmitting an uplink signal in a predetermined number of subframes by a user equipment in a wireless communication system, the method including determining a first reception timing point of an uplink grant based on a subframe (hereinafter, a first subframe) for application of the subframe bundling according to an uplink-downlink configuration, changing the subframe for application of the subframe bundling according to an uplink-downlink reconfiguration, determining a second reception timing point of the uplink grant based on the changed subframe (hereinafter, a second subframe), and attempting to decode the uplink grant for the subframes at the first reception timing point and the second reception timing point.

In another aspect of the present invention, provided herein is a user equipment for transmitting uplink data using subframe bundling of transmitting an uplink signal in a predetermined number of subframes in a wireless communication system, the user equipment including a radio frequency (RF) unit.

The user equipment includes a processor configured to control the RF unit, wherein the processor determines a first reception timing point of an uplink grant based on a subframe for application of the subframe bundling according to uplink-downlink configuration, changes the subframe for application of the subframe bundling according to uplink-downlink reconfiguration, determines a second reception timing point of the uplink grant based on the changed subframe (hereinafter, a second subframe), and attempts to decode the uplink grant for the subframes at the first reception timing point and the second reception timing point.

In both aspects, when decoding of the uplink grant is successful at both the first reception timing point and the second reception timing point, the uplink data may be transmitted based on the uplink grant of the later one of the first reception timing point and the second reception timing point, using the subframe bundling.

In both aspects, the first subframe may be a leading subframe of consecutive subframes for application of the subframe bundling before the uplink-downlink reconfiguration, and the second subframe may be a leading subframe of consecutive subframes subjected to the subframe bundling after the uplink-downlink reconfiguration, wherein a subframe positioned ahead of the first subframe by a first value is determined to be the first reception timing point, and a subframe positioned ahead of the second subframe by a second value is determined to be the second reception timing point.

In both aspects, when a configuration of at least one subframe of consecutive subframes for application of the subframe bundling before the uplink-downlink reconfiguration is changed from uplink to downlink by the uplink-downlink reconfiguration, the subframe bundling may be applied to uplink subframes subsequent to the changed subframe, a number of the subsequent uplink subframes being a number of the changed subframe.

In both aspects, the first subframe may be a leading subframe of consecutive subframes for application of the subframe bundling before the uplink-downlink reconfiguration, and the second subframe may be a leading subframe of consecutive subframes subjected to the subframe bundling after the uplink-downlink reconfiguration, wherein a subframe positioned ahead of the first subframe by a first value may be determined to be the first reception timing point, and a subframe positioned ahead of the second subframe by a second value may be determined to be the second reception timing point.

In both aspects, a third reception timing point of a response signal to the uplink data may be determined based on the first subframe, and a fourth reception timing point of the response signal to the uplink data may be determined based on the second subframe, wherein the response signal to the uplink data may be received in a subframe of earlier one of the third and fourth reception timing points.

In both aspects, when a configuration of at least one subframe of consecutive subframes for application of the subframe bundling before the uplink-downlink reconfiguration is changed from uplink to downlink by the uplink-downlink reconfiguration, the subframe bundling may be applied to uplink subframes subsequent to the changed subframe, a number of the subsequent uplink subframes being a number of the changed subframe.

In both aspects, the first subframe may be a last subframe of consecutive subframes for application of the subframe bundling before the uplink-downlink reconfiguration, and the second subframe may be a last subframe of consecutive subframes for application of the subframe bundling after the uplink-downlink reconfiguration, wherein a subframe positioned behind the first subframe by a third value may be determined to be the third reception timing point, and a subframe positioned behind the second subframe by a fourth value may be determined to be the fourth reception timing point.

The aforementioned aspects of the present invention are merely a part of preferred embodiments of the present invention. Those skilled in the art will derive and understand various embodiments reflecting the technical features of the present invention from the following detailed description of the present invention.

Advantageous Effects

According to one embodiment of the present invention, radio resources may be efficiently utilized in performing dynamic uplink/downlink configuration.

In addition, according to one embodiment of the present invention, unnecessary retransmission may be prevented in the subframe bundling transmission mode, and therefore radio resources may be efficiently utilized.

It will be appreciated by persons skilled in the art that that the effects that can be achieved through the embodiments of the present invention are not limited to those described above and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention. In the drawings:

FIG. 9 illustrates a subframe transmission method in a normal transmission mode;

FIG. 15 illustrates an exemplary method for redefining an allocation rule for transmission channels of PDCCH and PUSCH in a TDD system according to one embodiment of the present invention;

FIG. 16 illustrates an exemplary method for redefining an allocation rule for transmission channels of PUSCH and PHICH in an FDD system according to one embodiment of the present invention;

FIG. 17 illustrates an exemplary method for redefining an allocation rule for transmission channels of PUSCH and PHICH in a TDD system according to one embodiment of the present invention;

FIG. 18 illustrates another exemplary method for redefining an allocation rule for transmission channels of PUSCH and PHICH in a TDD system according to one embodiment of the present invention;

FIG. 19 illustrates examples of a method for defining a response channel for a subframe bundling transmission mode in an FDD system.

BEST MODE

Figure 1:
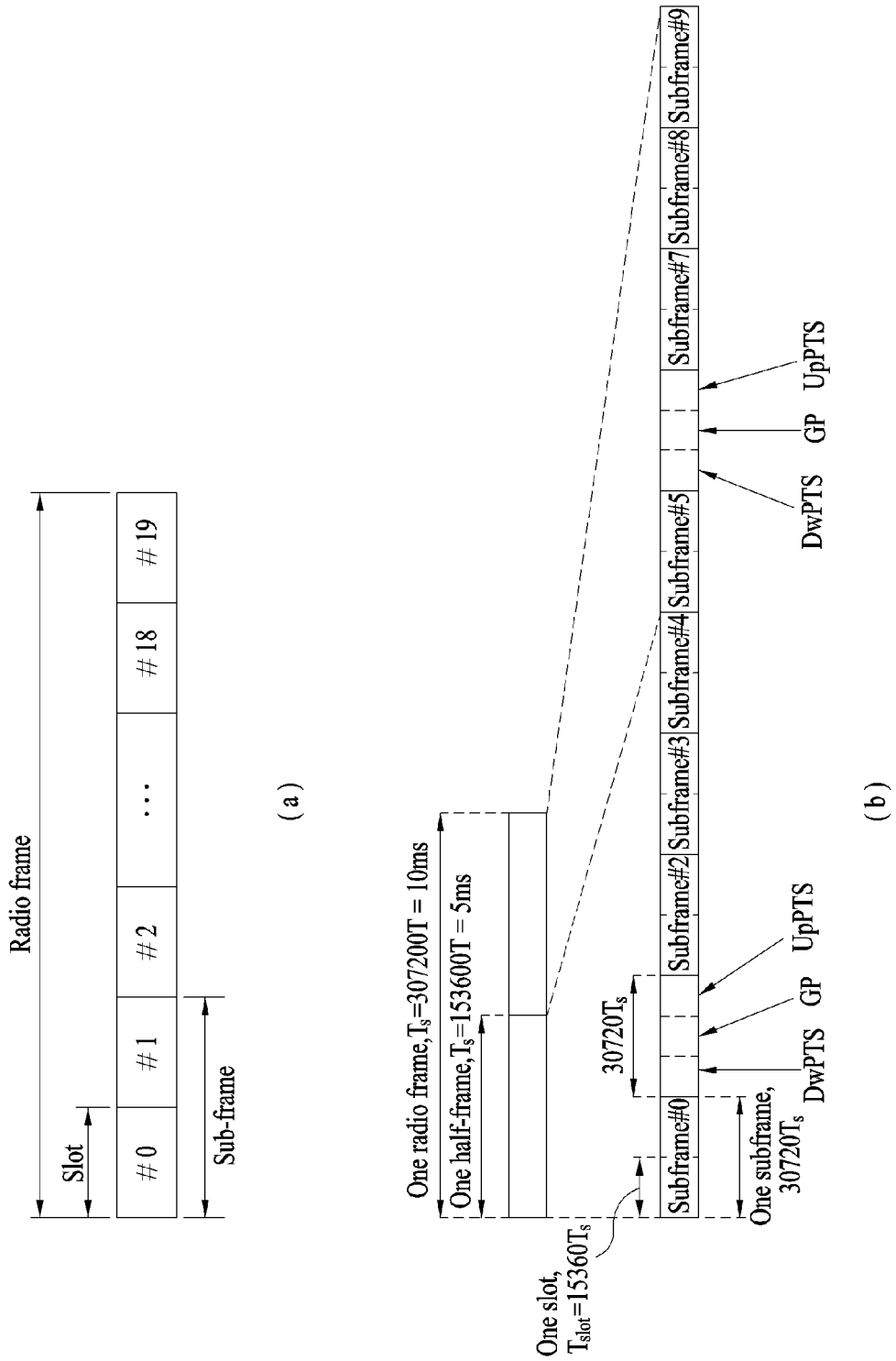
FIG. 1 illustrates an exemplary radio frame structure used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

In the present invention, a user equipment (UE) denotes a fixed or mobile type terminal. Examples of the UE include various devices that transmit and receive user data and/or various kinds of control information to and from a base station. The UE may be referred to as terminal equipment, a mobile station (MS), a mobile terminal (MT), a user terminal (UT), a subscriber station (SS), a wireless device, a personal digital assistant (PDA), a wireless modem, or a handheld device. In addition, in the present invention, a base station (BS) generally refers to a fixed station that performs communication with a UE and/or another BS, and exchanges various kinds of data and control information with the UE and another BS. The BS may also be referred to as an advanced base station (ABS), a node-B (NB), an evolved node-B (eNB), a base transceiver system (BTS), an access point (AP), or a processing server (PS).

In the present invention, a node refers to a fixed point capable of transmitting/receiving a radio signal to/from a UE through communication with the UE. Various BSs can be used as nodes regardless of how the BSs are named. For example, a node can be a BS, NB, eNB, pico-cell eNB (PeNB), home eNB (HeNB), relay, repeater, etc. Furthermore, a node may not be a BS. For example, a node can be a radio remote head (RRH) or a radio remote unit (RRU). At least one antenna is installed per node. An antenna may refer to a physical antenna, or may refer to an antenna port, a virtual antenna or an antenna group. A node is also called a point.

In the present invention, a cell refers to a specific geographical area in which one or more nodes provide communication services. Accordingly, communication with a specific cell may mean communication with a BS or a node that provides communication services to the specific cell. A downlink/uplink signal of a specific cell refers to a downlink/uplink signal from/to a BS or a node providing communication services to the specific cell. Furthermore, channel status/quality of a specific cell refers to channel status/quality of a channel or a communication link generated between a BS or a node providing communication services to the specific cell and a UE.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or resource element (RE) which is allocated to or belongs to PDCCH/PCFICH/PHICH/PDSCH/PUCCH/PUSCH/PRACH is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/a random access signal over or through PUCCH/PUSCH/PRACH. Furthermore, transmission of PDCCH/PCFICH/PHICH/PDSCH by a BS is equivalent to transmission of downlink data/control information over or through PDCCH/PCFICH/PHICH/PDSCH.

FIG. 1 illustrates an exemplary radio frame structure used in a wireless communication system. FIG. 1(a) illustrates a frame structure for frequency division duplex (FDD) used in a 3GPP LTE/LTE-A system, and FIG. 1(b) illustrates a frame structure for time division duplex (TDD) used in a 3GPP LTE/LTE-A system.

Referring to FIG. 1, a radio frame used in 3GPP LTE/LTE-A has a length of 10 ms (307200 Ts) and includes 10 subframes of equal size. Each of the 10 subframes in the radio frame may be assigned with a number. Herein, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). A time resource may be discriminated by a radio frame number (or radio frame index), a subframe number (or subframe index), and a slot number (or slot index).

The radio frame can be configured differently according to a duplex mode. For example, downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 exemplarily shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes a UL subframe, and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 2:
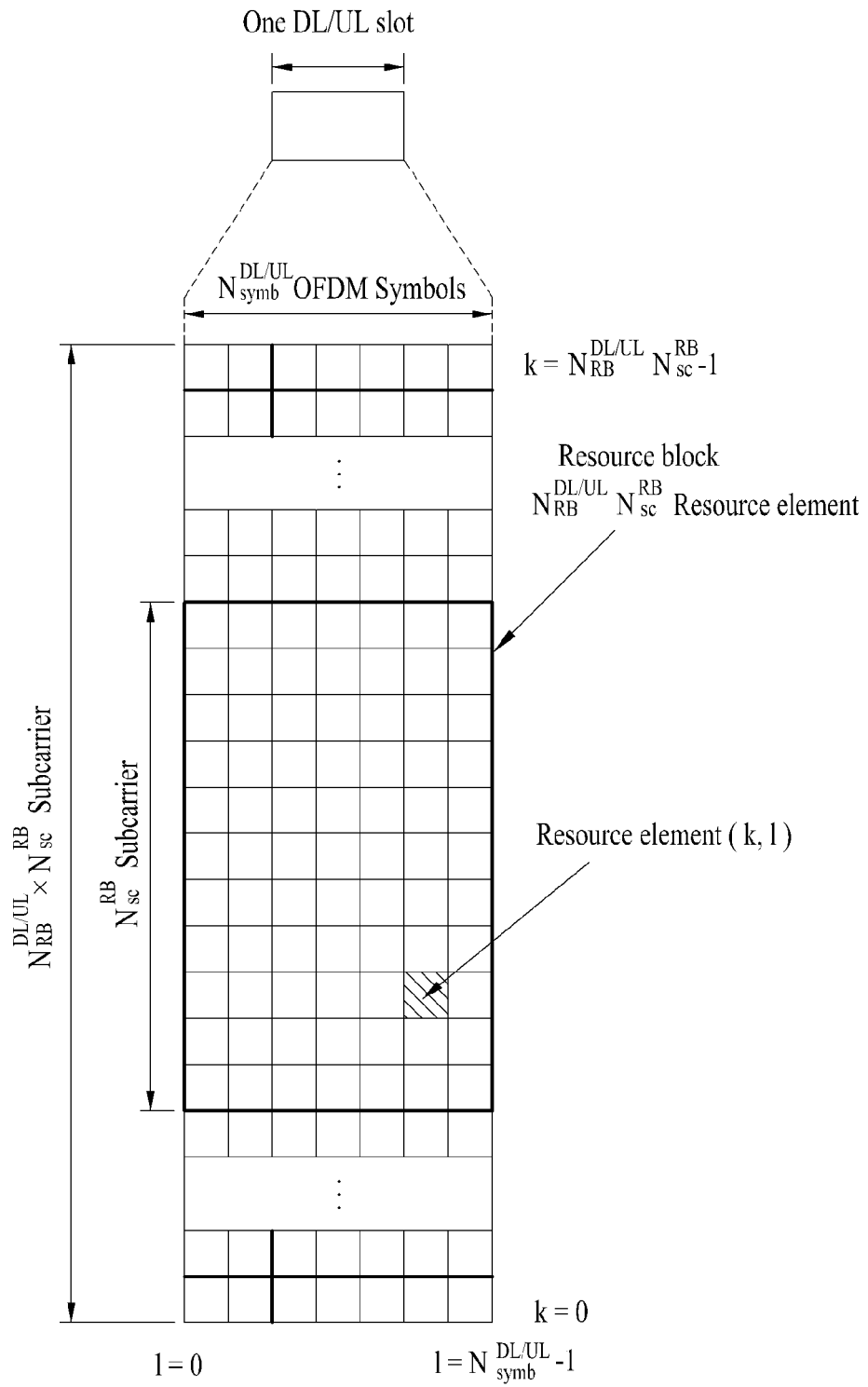
FIG. 2 illustrates an exemplary downlink/uplink (DL/UL) slot structure in a wireless communication system.

FIG. 2 illustrates an exemplary downlink/uplink (DL/UL) slot structure in a wireless communication system. Particularly, FIG. 2 illustrates a resource grid structure of the 3GPP LTE/LTE-A system. A resource grid is present per antenna port.

Referring to FIG. 2, a slot includes a plurality of OFDM (Orthogonal Frequency Division Multiplexing) symbols in the time domain and a plurality of RBs (RBs) in the frequency domain. An OFDM symbol may represent a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Herein, $N_{RB}^{DL}$ denotes the number of RBs in a downlink slot, and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot, and $N_{symb}^{UL}$ denotes the number of OFDM symbols in the uplink slot. $N_{sc}^{RB}$ denotes the number of subcarriers constructing one RB.

An OFDM symbol may be called an SC-FDM (Single Carrier Frequency Division Multiplexing) symbol according to a multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of an extended CP. While FIG. 2 illustrates a subframe in which a slot includes 7 OFDM symbols for simplicity of description, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The subcarrier for the DC component is an unused subcarrier and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and by $N_{sc}^{RB}$ (e.g. 12) consecutive subcarriers in the frequency domain. For reference, a resource constituted by an OFDM symbol and a subcarrier is called a resource element (RE) or a tone. Accordingly, one RB is composed of $N_{symb}^{DL/UL} * N_{sc}^{RB}$ REs. Each RE in a resource grid can be uniquely defined by an index pair (k, l) in a slot. Herein, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index).

Figure 3:
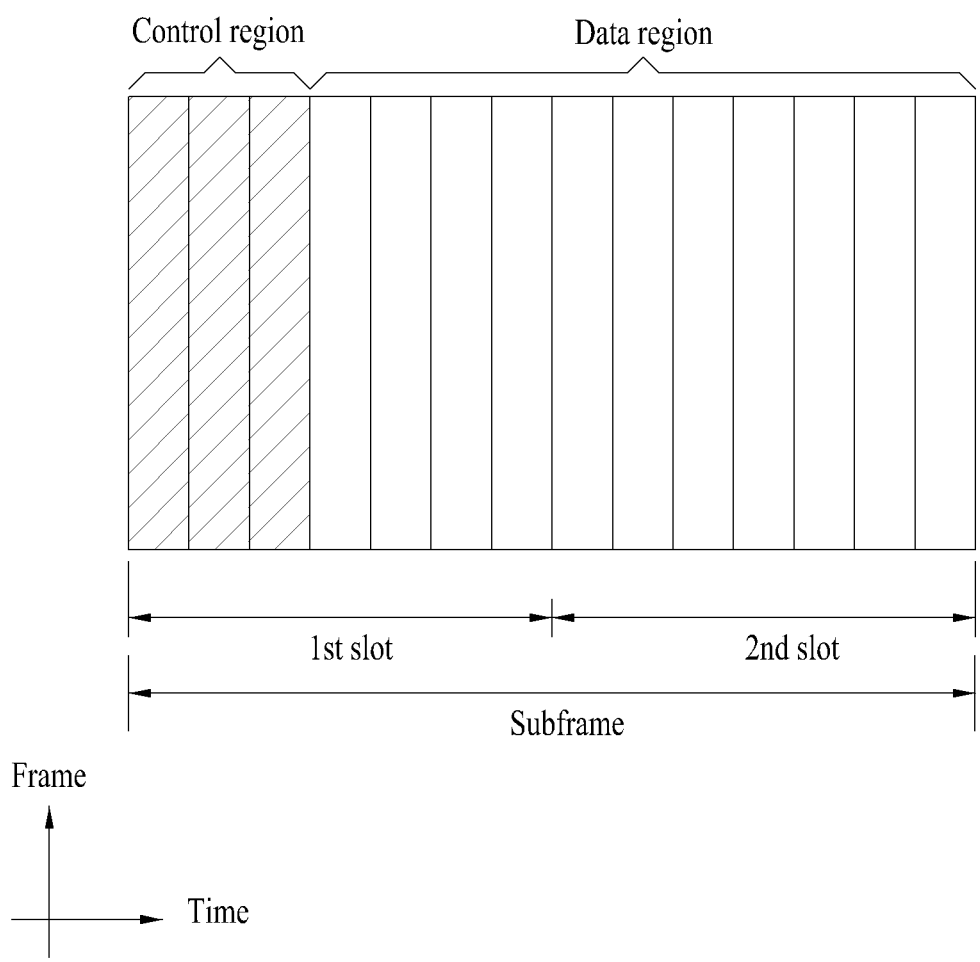
FIG. 3 illustrates an exemplary DL subframe structure used in a 3GPP LTE/LTE-A system.

FIG. 3 illustrates an exemplary DL subframe structure used in a 3GPP LTE/LTE-A system.

Referring to FIG. 3, a DL subframe is divided into a control region and a data region. A maximum of three (or four) OFDM symbols located in a front portion of a first slot within a subframe correspond to the control region to which a control channel is allocated. Hereinafter, a resource region available for PDCCH transmission in the DL subframe will be referred to as a PDCCH region. The remaining OFDM symbols correspond to the data region to which a physical downlink shared chancel (PDSCH) is allocated. Hereinafter, a resource region available for PDSCH transmission in the DL subframe will be referred to as a PDSCH region. Examples of downlink control channels used in 3GPP LTE include a physical control format indicator channel (PCFICH), a physical downlink control channel (PDCCH) and a physical hybrid ARQ indicator channel (PHICH). The PCFICH is transmitted at a first OFDM symbol of a subframe and carries information about the number of OFDM symbols used for transmission of control channels within the subframe. The PHICH carries a HARQ acknowledgment (ACK)/negative acknowledgment (NACK) signal as a response to UL transmission.

Control information transmitted over the PDCCH is referred to as downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted over the PDSCH, a transmit control command set for individual UEs in a UE group, a transmit power control (TPC) command, indication information on activation of a voice over IP (VoIP), and a downlink assignment index (DAI). The transmission format and resource allocation information of the DL-SCH are referred to as DL scheduling information or a DL grant and the transmission format and resource allocation information of the UL-SCH are referred to as UL scheduling information or a UL grant.

The PDCCH is transmitted on an aggregation of one or several consecutive control channel elements (CCEs). The CCE is a logical allocation unit used to provide the PDCCH with a coding rate based on the state of a radio channel. The CCE corresponds to a plurality of resource element groups (REGs). For example, one CCE corresponds to 9 REGs and one REG corresponds to 4 REs. 3GPP LTE defines a CCE set in which a PDCCH can be located for each UE. A CCE set in which a UE can detect a PDCCH thereof is called a PDCCH search space, or simply a search space. An individual resource through which the PDCCH can be transmitted in the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. A PDCCH candidate corresponds to 1, 2, 4 or 8 CCEs according to CCE aggregation level. A BS transmits a PDCCH (DCI) on an arbitrary PDCCH candidate within a search space, and a UE monitors the search space to detect the PDCCH (DCI). Herein, monitoring refers to attempting to decode each PDCCH in the corresponding search space according to all monitored DCI formats. The UE may detect the PDCCH therefor by monitoring plural PDCCHs. Since the UE does not know the position in which the PDCCH thereof is transmitted, the UE attempts to decode all PDCCHs of the corresponding DCI format in every subframe until a PDCCH having the ID of the UE is detected. This process is referred to as blind detection (or blind decoding (BD)).

The BS may transmit data for a UE or a UE group through the data region. Data transmitted through the data region may be called user data. For transmission of the user data, a physical downlink shared channel (PDSCH) may be allocated to the data region. A paging channel (PCH) and a downlink-shared channel (DL-SCH) are transmitted through the PDSCH. The UE can read data transmitted through the PDSCH by decoding control information transmitted through a PDCCH. The size and purpose of DCI carried on a PDCCH depend on DCI format and the size thereof may be varied according to coding rate. Information indicating a UE or a UE group to which data on the PDSCH is transmitted, how the UE or UE group should receive and decode the PDSCH data, etc. is included in the PDCCH and transmitted. For example, if a specific PDCCH is CRC (cyclic redundancy check)-masked with a radio network temporary identifier (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information that the UE has. The UE, which has the RNTI of "A", detects a PDCCH and receives a PDSCH indicated by "B" and "C" using the received information about the PDCCH.

Figure 4:
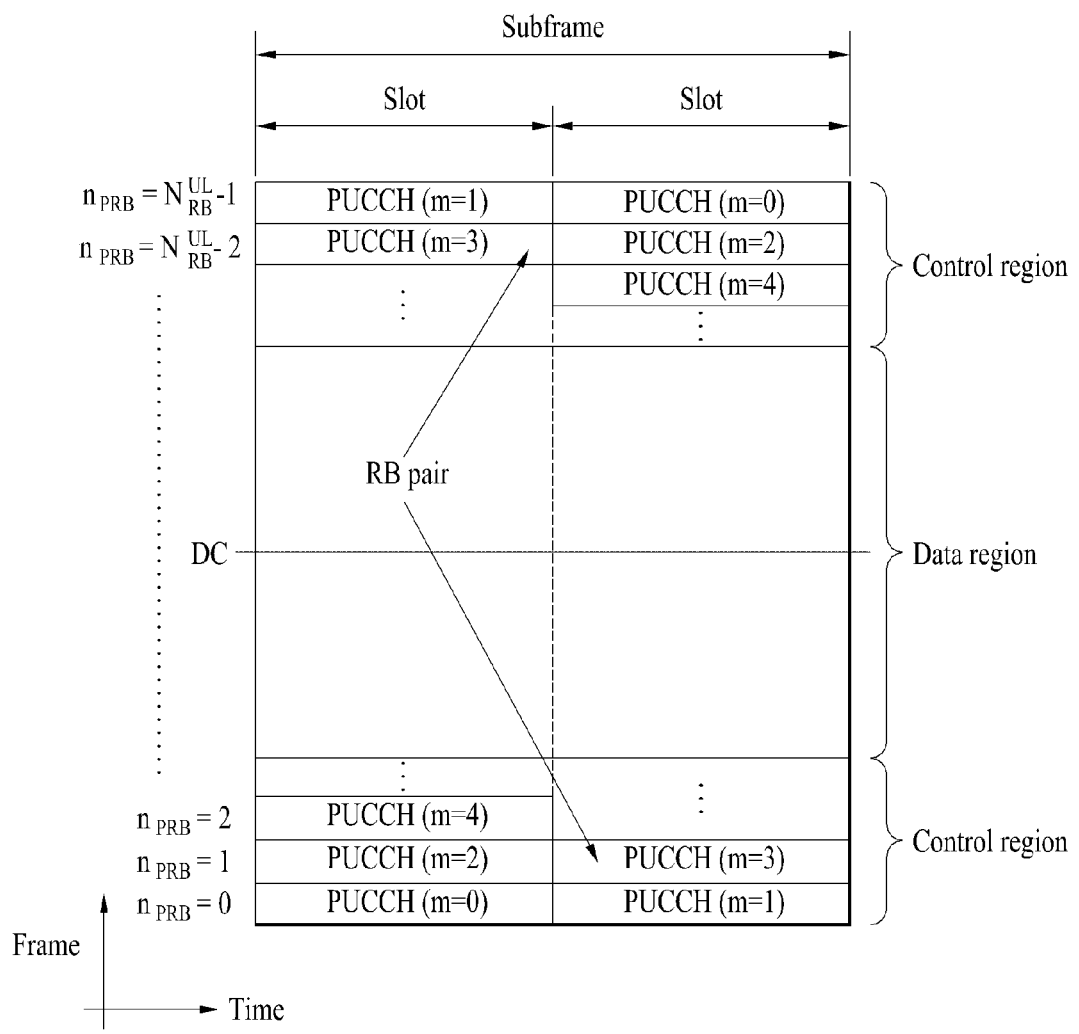
FIG. 4 illustrates an exemplary UL subframe structure used in a 3GPP LTE/LTE-A system.

FIG. 4 illustrates an exemplary UL subframe structure used in a 3GPP LTE/LTE-A system.

Referring to FIG. 4, a UL subframe can be divided into a control region and a data region in the frequency domain. One or more physical uplink control channels (PUCCHs) may be allocated to the control region to carry uplink control information (UCI). One or more PUSCHs (physical uplink shared channels) may be allocated to the data region of the UL subframe to carry user data. The control region and data region in the UL subframe are also referred to as a PUCCH region and a PUSCH region, respectively. A sounding reference signal (SRS) may be allocated to the data region. The SRS is transmitted on the last OFDM symbol of the UL subframe in the time domain and is transmitted in a data transmission band, that is, a data region, of the UL subframe in the frequency domain. SRSs of several UEs which are transmitted/received on the last OFDM symbol of the same subframe can be distinguished according to a frequency location/sequence.

If a UE employs an SC-FDMA scheme in UL transmission, in a 3GPP LTE release-8 or release-9 system, a PUCCH and a PUSCH cannot be transmitted simultaneously on one carrier in order to maintain a single carrier property. In a 3GPP LTE release-10 system, whether or not simultaneous transmission of the PUCCH and the PUSCH is supported may be indicated by higher layer signaling.

In the UL subframe, subcarriers spaced far apart from a direct current (DC) subcarrier are utilized as the control region. In other words, the subcarriers located at both ends of a UL transmission bandwidth are allocated for UCI transmission. The DC subcarrier, which is a component that is not used for signal transmission, is mapped to the carrier frequency f0 during frequency up-conversion. A PUCCH for a UE is allocated to an RB pair belonging to resources operating at a carrier frequency, and the RBs belonging to the RB pair occupy different subcarriers in two slots. Allocation of the PUCCH in this manner is represented as frequency hopping of an RB pair allocated to the PUCCH at a slot boundary. When frequency hopping is not applied, the RB pair occupies the same subcarrier.

Figure 5:
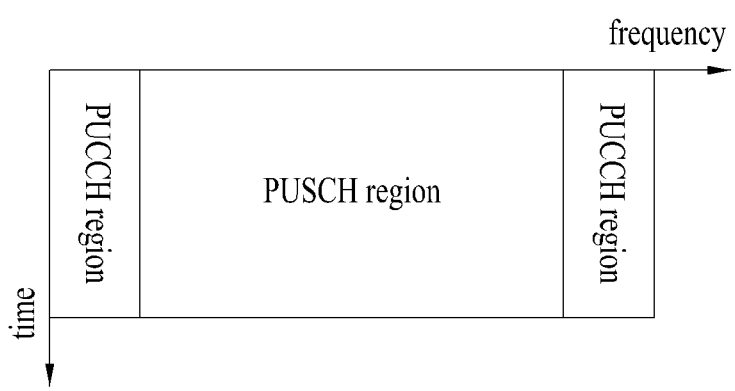
FIG. 5 shows a subframe illustrating periodic control information.

FIG. 5 shows a subframe illustrating periodic control information. As shown in FIG. 5, a subframe is divided into a region in which transmission is conducted through a PUSCH and a region in which transmission is conducted through a physical uplink control channel (PUCCH).

A BS may set a UE such that the UE transmits control information with a certain periodicity. The UE set to periodically transmit the control information on UL periodically transmits CQI/PMI or rank information in a specific subframe. If there is no data to be transmitted at the time at which the periodic control information needs to be transmitted, the UE transmits the periodic control information on UL through the PUCCH. On the other hand, if there is data to be transmitted at the time the periodic control information needs to be transmitted, the UE transmits the data and the periodic control information on UL through the PUSCH by conducting multiplexing of the data and the periodic control information.

Aperiodic control information is triggered at the uplink scheduling grant which the BS transmits to the UE through a physical downlink control channel (PDCCH) for DL, and is transmitted on uplink. Herein, the uplink scheduling grant informs the UE of various kinds of information such as a specific frequency in the PUSCH region and a transmitted resource block for transmission of data or aperiodic control information.

The aperiodic control information can be transmitted only through the PUSCH. The aperiodic control information is transmitted only when transmission of the aperiodic control information is granted by the uplink scheduling grant received from the BS.

Figure 6:
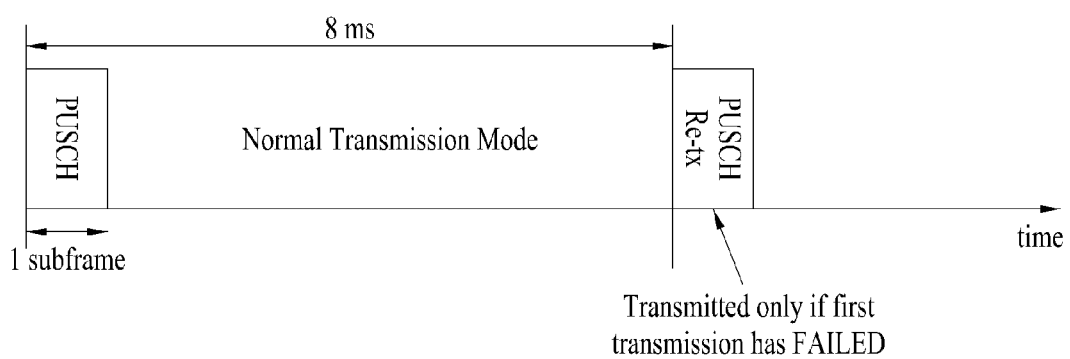
FIG. 6 illustrates a subframe transmission method in a normal transmission mode of an FDD system.

FIG. 6 illustrates a subframe transmission method in a normal transmission mode of an FDD system. As shown in FIG. 6, all data is transmitted in one subframe unit in the normal transmission mode. In addition, when an error is produced in the data of a specific PUSCH, the UE may retransmit the same data after 8 transmission time intervals (TTIs) (i.e., 8 ms in FIG. 5). By retransmitting the data if there is an error in the data transmitted through a specific channel, errors may be controlled. Hereinafter, an error control method which is applicable to both the FDD system and the TDD system will be described in more detail.

A BS schedules one or more RBs for a UE selected according to a determined scheduling rule on DL, and then transmits data to the UE using the allocated RB. Hereinafter, the scheduling information for DL transmission will be referred to as DL grant, and the PDCCH carrying the DL grant will be referred to as a DL grant PDCCH. On the UL, the BS schedules one or more RBs for the UE selected according to a determined scheduling rule and the UE transmits data using the allocated resource. Hereinafter, the scheduling information for UL transmission will be referred to as UL grant, and the PDCCH carrying the UL grant will be referred to as a UL grant PDCCH. Examples of a method of controlling an error for a data transmission include an ARQ (automatic repeat request) scheme and a HARQ (hybrid ARQ) scheme, which is an advanced scheme. In both the ARQ scheme and the HARQ scheme, a confirmation signal (ACK) is waited for after data (e.g., a transmission block or codeword) is transmitted. A receiver sends the confirmation signal (ACK) only when data is successfully received. If there is an error in the received data, the receiver sends a NACK (negative-ACK) signal. A transmitter transmits data after the ACK signal is received. If the NACK signal is received, the transmitter retransmits the data. If error data occurs, the ARQ scheme and the HARQ scheme differently process the error data. In the ARQ scheme, the error data is deleted from a buffer of the receiver and is not used in a subsequent process. On the other hand, in the HARQ scheme, the error data is stored in a HARQ buffer and then combined with subsequent retransmission data so as to increase the success rate of reception.

In the case of a 3GPP LTE/LTE-A system, an RLC (radio link control) layer performs error control using the ARQ scheme and a MAC (medium access control)/PHY (physical) layer perform error control using the HARQ scheme. The HARQ scheme is classified into synchronous HARQ and asynchronous HARQ according to retransmission timing. The HARQ scheme may also be classified into channel-adaptive HARQ and channel-non-adaptive HARQ depending on whether a channel state is considered in determining the amount of a retransmission resource.

Synchronous HARQ is a scheme in which retransmission is performed at a timing point determined by a system if initial transmission has failed. For instance, if retransmission is performed at every X (e.g., X=4) time units (e.g., TTIs, subframes) after initial transmission has failed, the BS and the UE do not need to exchange information on the retransmission timing. Accordingly, if a NACK message is received, the transmitter can retransmit the data every 4 time units until an ACK message is received. On the other hand, in the asynchronous HARQ scheme, the retransmission timing may be scheduled anew or achieved through additional signaling. That is, variation of the retransmission timing for error data may depend on such various factors as channel state.

The channel-non-adaptive HARQ scheme is a scheme in which a modulation and coding scheme (MCS), the number of RBs, and the like for retransmission are determined when initial transmission is performed. Unlike in the channel-non-adaptive HARQ scheme, the channel-adaptive HARQ scheme is a scheme in which the MCS, the number of RBs, and the like for retransmission vary according to channel state. For example, in the channel-non-adaptive HARQ scheme, if initial transmission is performed using 6 RBs, retransmission is also performed using 6 RBs. On the other hand, in the channel-adaptive HARQ scheme, if initial transmission is performed using 6 RBs, retransmission may be performed using more than or less than 6 RBs depending on the channel state.

According to the aforementioned classification, 4 kinds of HARQ combination are possible, and an asynchronous/channel-adaptive HARQ scheme and a synchronous/channel-non-adaptive HARQ scheme are mainly used. The asynchronous/channel-adaptive HARQ scheme can maximize retransmission efficiency by adaptively changing retransmission timing and the amount of a retransmission resource according to the channel state, but has a drawback of a significant overhead. Accordingly, this scheme is not considered for UL in general. Meanwhile, in the synchronous/channel-non-adaptive HARQ scheme, timing for retransmission and resource allocation are predetermined in a system, and thus there is little overhead. However, when this scheme is used in an unstable channel state, it shows a drawback of very low retransmission efficiency. Currently, the asynchronous HARQ scheme is used for DL and the synchronous HARQ scheme is used for DL in 3GPP LTE(-A).

Figure 7:
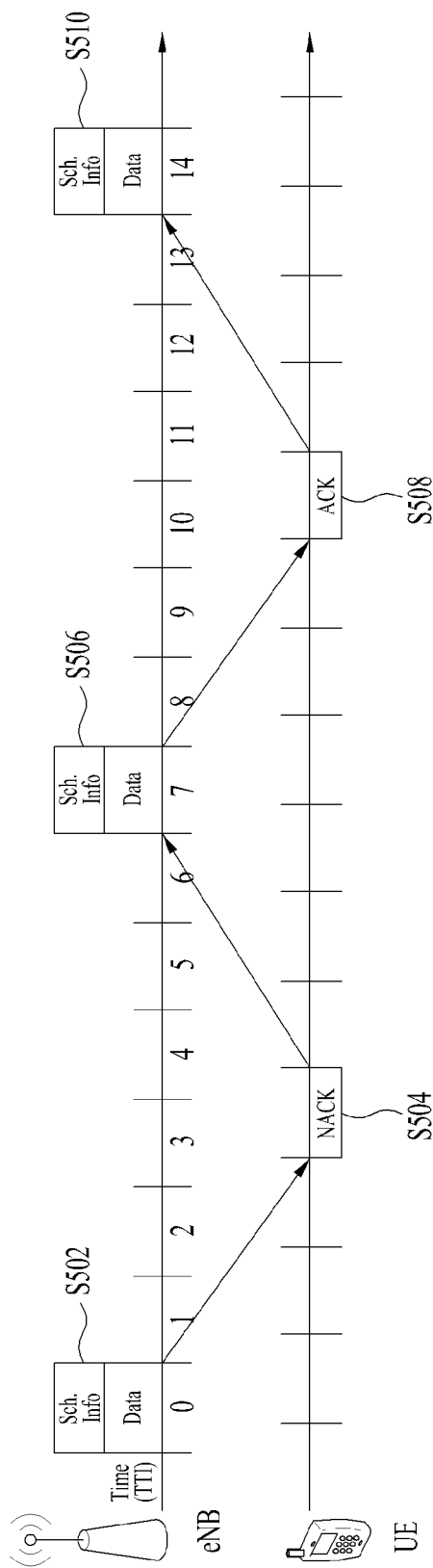
FIG. 7 illustrates an exemplary resource allocation and retransmission process in an asynchronous DL HARQ scheme.

FIG. 7 illustrates an exemplary resource allocation and retransmission process in an asynchronous DL HARQ scheme.

Referring to FIG. 7, a BS transmits scheduling information (Sch. Info)/data (e.g., transmission block or codeword) to a UE (S502) and then waits for ACK/NACK to be received from the UE. If NACK is received from the UE (S504), the BS retransmits scheduling information/data to the UE (S506) and then waits for ACK/NACK to be received from the UE. If ACK is received from the UE (S508), a HARQ process is terminated. Thereafter, when new data transmission is required, the BS may transmit scheduling information on the new data and the data to the UE (S510).

Meanwhile, referring to FIG. 7, after transmission of the scheduling information/data is performed (S502), a time delay occurs until the ACK/NACK is received from the UE and the retransmission data is transmitted. The time delay results from a channel propagation delay and time taken to perform data decoding/encoding. Accordingly, until new data is sent after a current HARQ process is completed, data transmission is suspended due to the time delay. Accordingly, to prevent such suspension from occurring during the time delay period, plural independent HARQ processes are employed. For example, if the interval between the initial transmission and retransmission corresponds to 7 subframes, data transmission may be performed without suspension by managing 7 independent HARQ processes. The parallel HARQ processes allow UL/DL transmission to be continuously performed while the HARQ feedback for the previous UL/DL transmission is awaited. Each of the HARQ processes is associated with a HARQ buffer of a medium access control (MAC) layer. Each of the HARQ processes manages state variables such as the number of times of transmission of MAC PDU (physical data block) in a buffer, a HARQ feedback for the MAC PDU in the buffer, a current redundancy version, and the like.

Specifically, in the case of 3GPP LTE-A FDD, the maximum number of DL HARQ processes is 8. If carrier aggregation (CA) of aggregating a plurality of carriers is set, up to 8 HARQ processes may be allocated for each carrier set for the UE. In the case of 3GPP LTE(-A) TDD, the maximum number of DL HARQ processes varies depending on the UL-DL configuration. If CA is set, the maximum number of DL HARQ processes varies depending on the TDD UL-DL configuration of each carrier set for the UE. Table 3 exemplarily shows the maximum number of asynchronous DL HARQ processes in TDD.

TABLE 3

| TDD UL-DL configuration | Maximum number of HARQ processes |
| --- | --- |
| 0 | 4 |
| 1 | 7 |
| 2 | 10 |
| 3 | 9 |
| 4 | 12 |
| 5 | 15 |
| 6 | 6 |

For TDD, the maximum number of DL HARQ processes for each carrier set for the UE is determined according to the TDD UL-DL configuration. For FDD, each carrier set for one UE may have 8 DL/UL HARQ processes, the number of HARQ processes for each carrier set for one UE may depend on the TDD UL-DL configuration of the carrier.

In the case of 3GPP LTE(-A) FDD, if operation is not performed in MIMO (multiple input multiple output), 8 UL HARQ processes are allocated for each carrier set for the UE. In the case of 3GPP LTE(-A) TDD, the number of UL HARQ processes varies according to the UL-DL configuration. Table 4 shows the number of synchronous UL HARQ processes in TDD.

TABLE 4

| TDD UL-DL configuration | Number of HARQ processes for normal HARQ operation | Number of HARQ processes for subframe bundling operation |
| --- | --- | --- |
| 0 | 7 | 3 |
| 1 | 4 | 2 |
| 2 | 2 | N/A |
| 3 | 3 | N/A |
| 4 | 2 | N/A |
| 5 | 1 | N/A |
| 6 | 6 | 3 |

Figure 8:
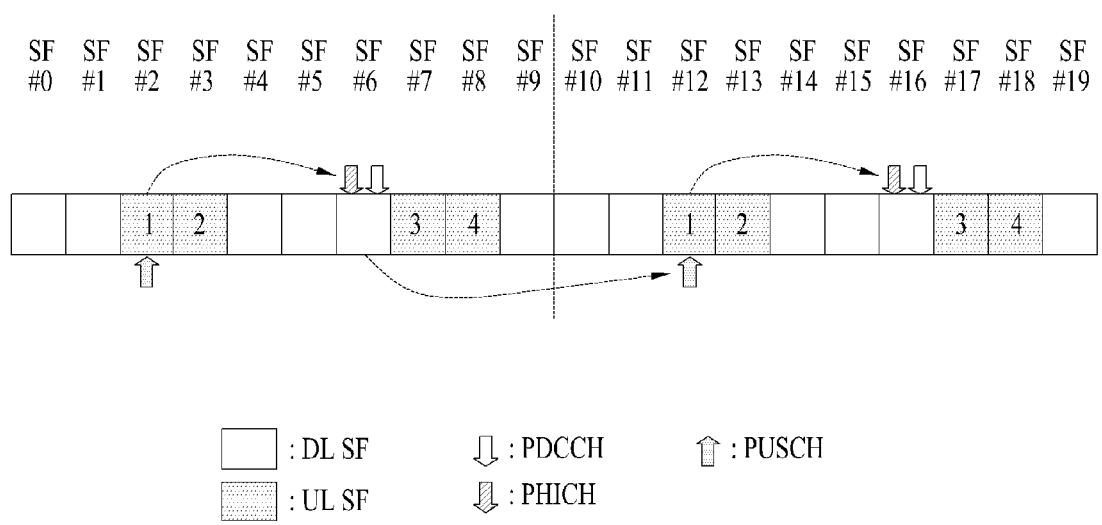
FIG. 8 illustrates an exemplary synchronous UL HARQ process for TDD UL-DL configuration #1.

FIG. 8 illustrates an exemplary synchronous UL HARQ process for the TDD UL-DL configuration #1. The numbers in boxes exemplify UL HARQ process numbers. The example of FIG. 8 represents a normal UL HARQ process.

Referring to FIG. 8, a HARQ process #1 is related to subframe (SF) #2, SF #6, SF #12, and SF #16. For instance, if an initial PUSCH signal (e.g., redundancy version (RV)=0) is transmitted in SF #2, a corresponding UL grant PDCCH and/or PHICH is received in the SF #6 and a corresponding (retransmission) PUSCH signal (e.g., RV=2) can be transmitted in the SF #12. Accordingly, in the case of the UL-DL configuration #1, there exist 4 UL HARQ processes for which round trip time (RTT) corresponds to 10 SFs (or 10 ms).

Figure 9:
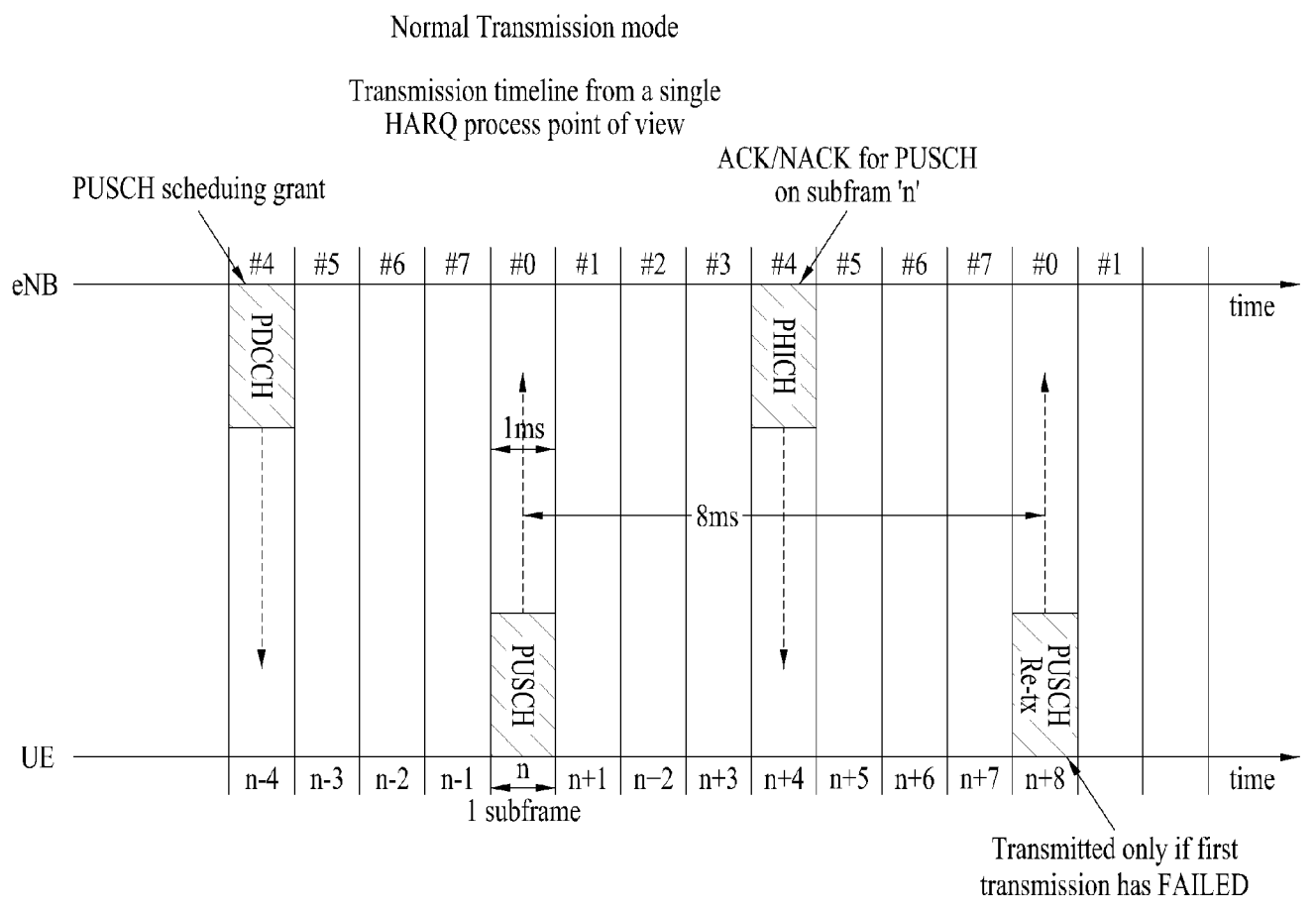

FIG. 9 illustrates a method for transmission of a UL signal through a PUSCH in the normal transmission mode. In the normal transmission mode, 8 HARQ processes operate at 8 SF intervals. In view of a specific HARQ process, if the UE receives a PUSCH scheduling grant signal through the PDCCH in subframe n−4, the UE transmits the PUSCH in subframe n, and receives ACK/NACK for the transmitted PUSCH in subframe n+4. If NACK is received, retransmission is performed in subframe n+8.

Figure 10:
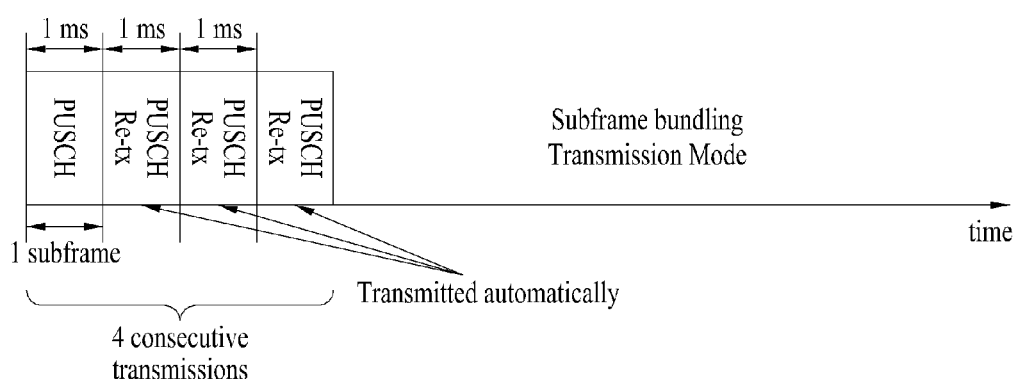
FIG. 10 illustrates a subframe transmission method in a subframe bundling transmission mode.

FIG. 10 illustrates a subframe transmission method for transmitting a UL signal through the PUSCH in a subframe bundling transmission mode. If the UE is distant from the BS or the condition of a radio link is not good, the BS may set the UE such that the UE operates in the subframe bundling transmission mode. As shown in FIG. 10, the UE set to operate in the subframe bundling transmission mode transmits data using a predetermined number of consecutive subframes in the time axis.

Figure 11:
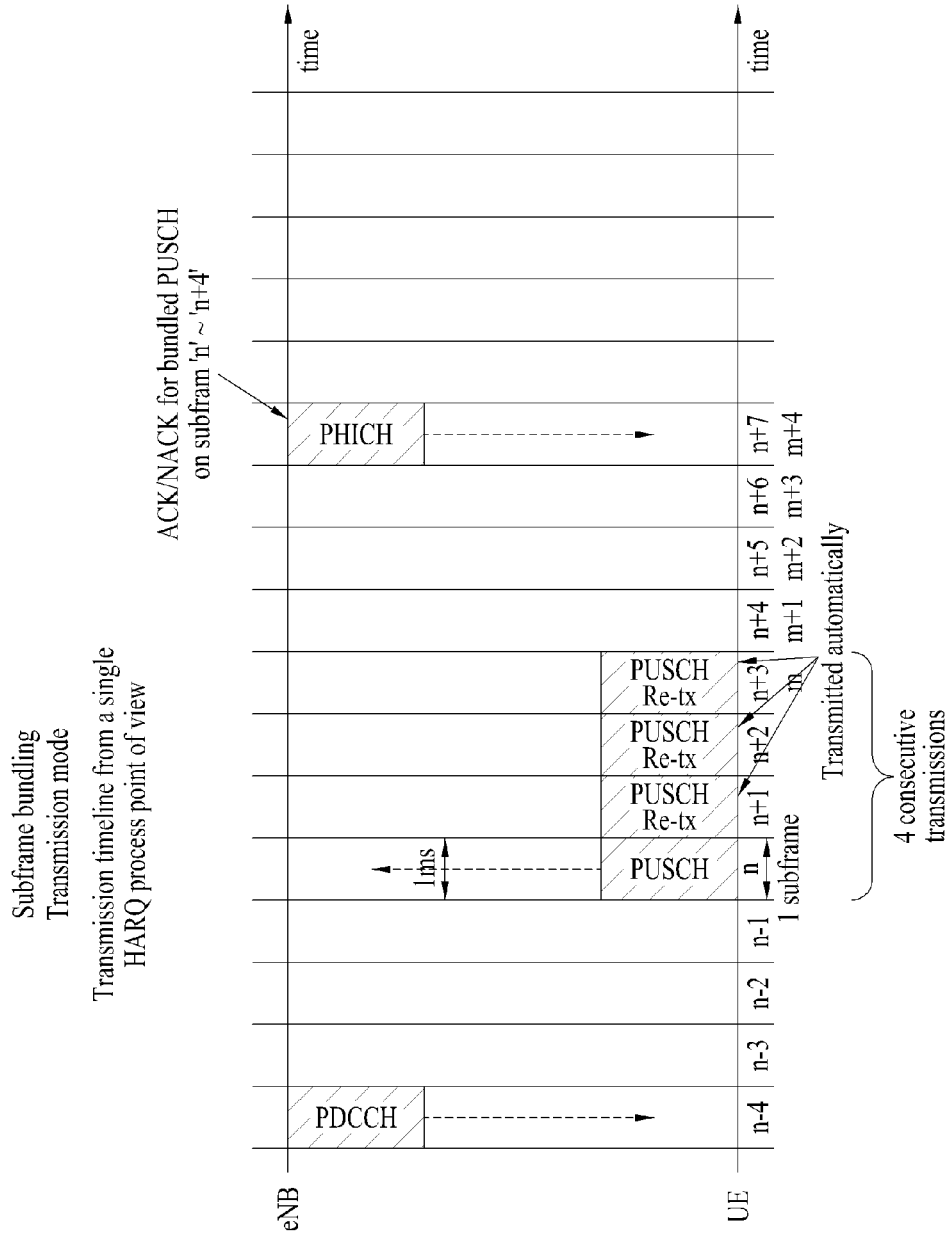
FIG. 11 illustrates a subframe transmission method in a subframe bundling transmission mode of an FDD system.

FIG. 11 illustrates an exemplary method for allocating a PDCCH, a PUSCH and a PHICH in the subframe bundling transmission mode of the FDD system. As shown in FIG. 11, in the subframe bundling transmission mode, 4 HARQ processes operate at 16 subframe intervals. In view of a specific HARQ process, if the UE receives a PUSCH scheduling grant signal in subframe n−4 through the PDCCH, it transmits the PUSCH in subframe n. In addition, unlike in the normal transmission mode, retransmission is immediately performed in subframes n+1, n+2 and n+3, an ACK/NACK signal for four consecutive transmissions of the PUSCH is received in subframe n+7 (i.e., subframe m+4 if the last PUSCH transmission is performed in subframe m).

Figure 12:
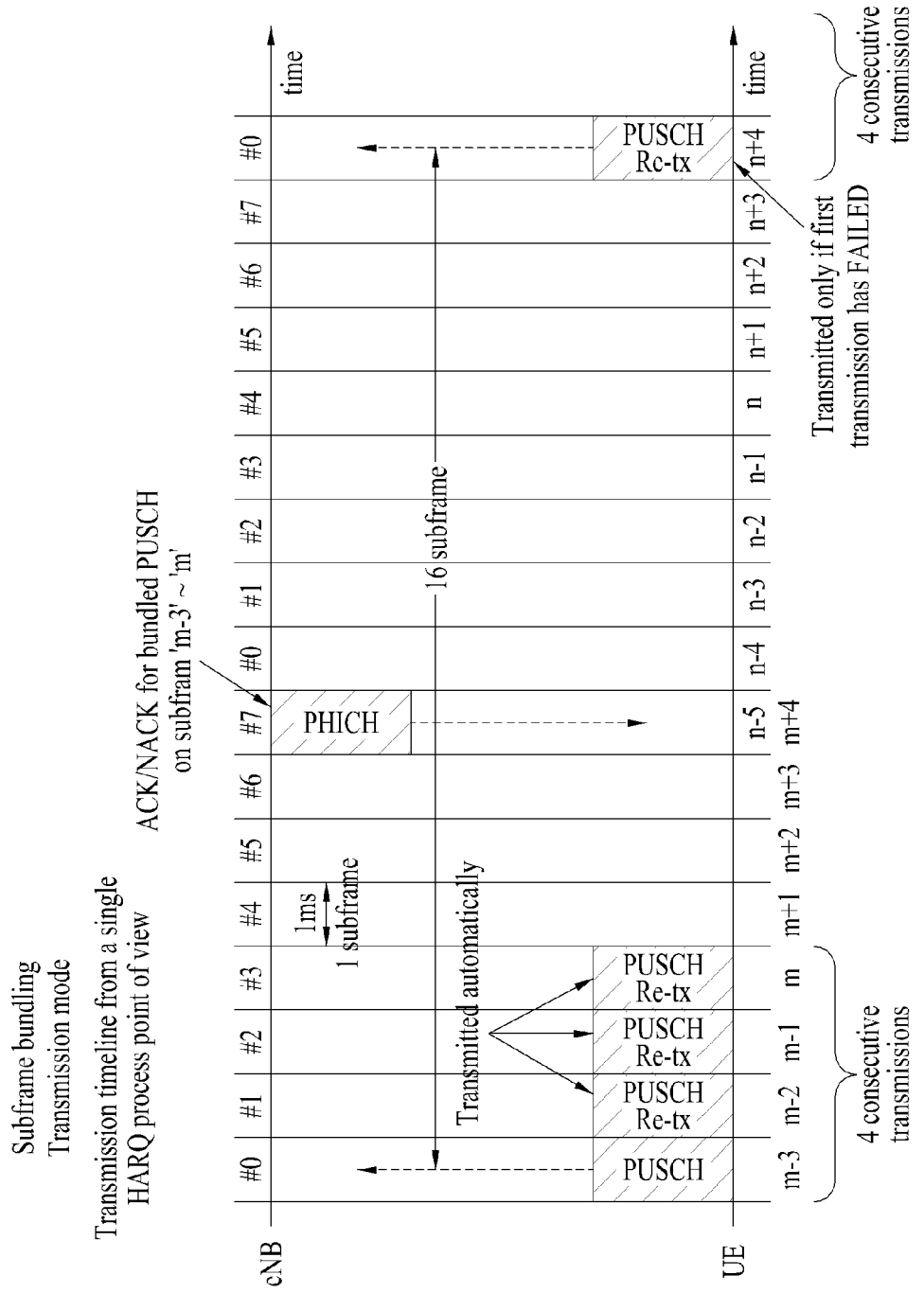
FIG. 12 illustrates a subframe transmission method in a subframe bundling transmission mode of an FDD system.

FIG. 12 illustrates retransmission of a UL signal performed when bundling transmission through the PUSCH fails once in the subframe bundling transmission mode of the FDD system. As shown in FIG. 12, if a NACK signal is received in subframe n−5, retransmission is performed in four consecutive subframes including subframe n+4. Unlike in the normal transmission mode, retransmission is not performed when four subframes elapse after reception of the ACK/NACK. This is intended to cause retransmission to be performed at 16 subframe intervals from the subframe in which initial PUSCH transmission is performed.

In view of one of a predetermined number (e.g., 4) of consecutive subframes in the time axis, data is transmitted through the PUSCH as in the normal transmission mode. In the subframe bundling transmission mode, each of the four subframes is configured in the same way as the subframes in the normal transmission mode. The subframe bundling transmission mode differs from the normal transmission mode only in that the four consecutive subframes are transmitted in the time axis.

Accordingly, in view of the physical layer, there is no difference between the subframe bundling transmission mode and the normal transmission mode, except that a transmission signal is transmitted in one subframe unit in the normal transmission mode, while the transmission signal is transmitted four times consecutively in the time axis in the subframe bundling transmission mode.

Figure 13:
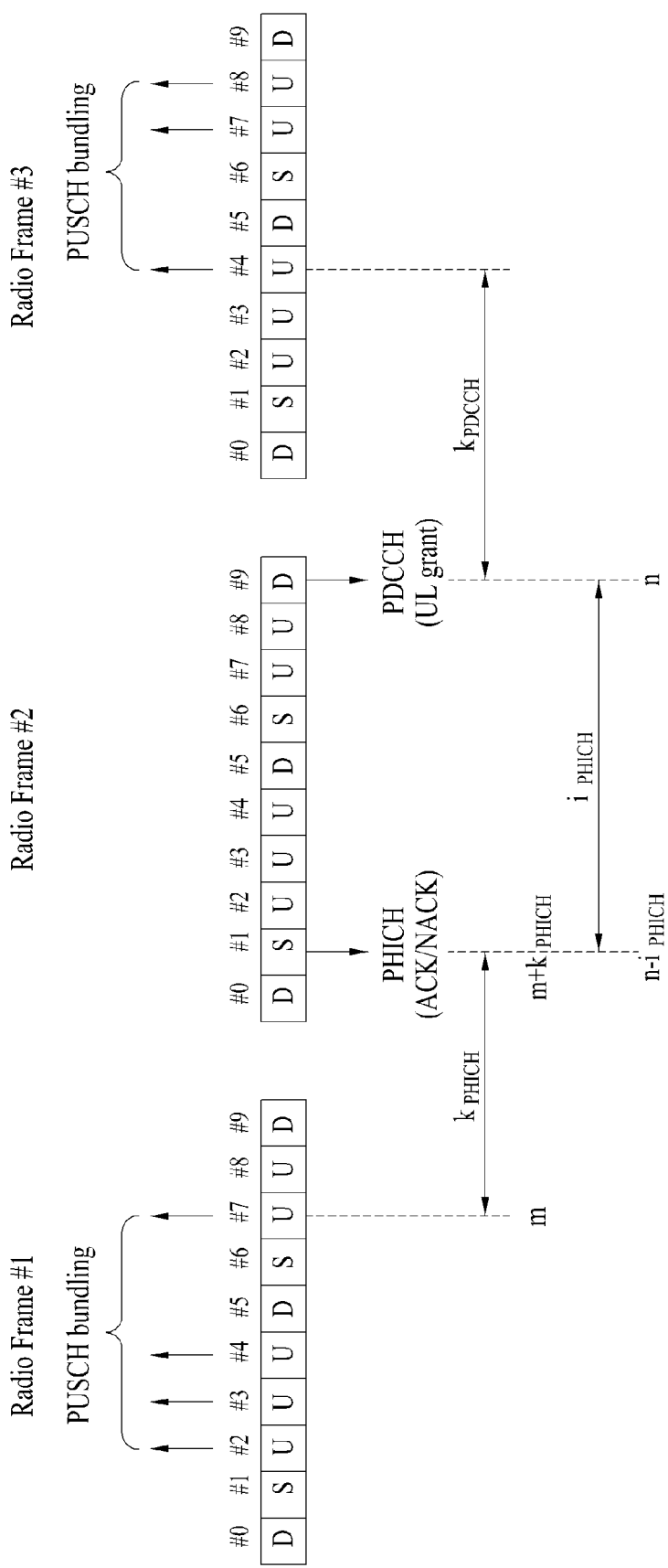
FIG. 13 illustrates a subframe transmission method in a subframe bundling transmission mode of a TDD system.

FIG. 13 illustrates a method for transmitting a signal in a subframe through the PUSCH, PHICH and PDCCH in the subframe bundling transmission mode of the TDD system. FIG. 13 exemplarily shows the case of DL-UL configuration 6 in Table 1 for radio frame #1 to radio frame #3. In each radio frame, subframes are numbered #0 to #9. In addition, as in the previous example, a UL signal is transmitted through the PUSCH in four consecutive UL frames in the time axis, in the subframe bundling transmission mode.

The position of a subframe in which an ACK/NACK signal for the subframe bundling transmission is received may be determined based on the number of the last subframe in the subframe bundling transmission mode. That is, if the number of the last subframe in the subframe bundling transmission mode is m (see FIG. 13), an ACK/NACK signal received through the PHICH is received in subframe m+$k_{PHICH}$. In this case, $k_{PHICH}$ may be determined according to a DL-UL configuration of the TDD system, the value of n, and Table 5 shown below.

TABLE 5

| TDD DL-UL configuration | Subframe index m | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

In the example of FIG. 13, the DL-UL configuration is 6, and the index m of the last subframe in the subframe bundling transmission mode is 7. Therefore, it can be seen from Table 5 that the value of $k_{PHICH}$ is 4. Accordingly, an ACK/NACK signal for the subframe bundling transmission may be received four subframes after subframe #7, namely in subframe #11 (i.e., subframe #1 of radio frame #2).

The position of the subframe for reception of the ACK/NACK signal through the PHICH may have the following relationship with a subframe in which a UL grant for the next subframe bundling transmission is received. If the number of a subframe in which the UL grant for a subframe bundling transmission is n, the subframe in which ACK/NACK is received for the previous subframe bundling transmission is subframe n−$i_{PHICH}$, $i_{PHICH}$ is determined according to Table 6 shown below.

TABLE 6

| TDD DL-UL configuration | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | 9 | 6 | | | | 9 | 6 | | | |
| 1 | | 2 | | 3 | | | 2 | | | 3 |
| 6 | 5 | 5 | | | | | 6 | 6 | | 8 |

That is, in the example of FIG. 13, the DL-UL configuration is 6, and the subframe number n is 9. Therefore, it can be seen from Table 6 that the corresponding value of iPHICH is 8. Accordingly, it can be seen that the ACK/NACK signal is received through the PHICH in subframe #1, which equals the number of subframe #9 minus 8.

If the number of a subframe in which the UL grant is received is n, the first frame for corresponding subframe bundling is defined as subframe n+$k_{PDCCH}$, and $k_{PDCCH}$ may be determined by Table 7 shown below.

TABLE 7

| TDD DL-UL configuration | Subframe index m | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | | 4 | 6 | | |
| 1 | | | 6 | | 4 | | | 6 | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

In the example of FIG. 13, the DL-UL configuration is 6, and the subframe number n is 9. Therefore, it can be seen from Table 7 that the corresponding value of $k_{PDCCH}$ is 5. Accordingly, the first frame for subframe bundling transmission for the UL grant received in subframe #9 of radio frame #2 may be determined to be subframe #4 of radio frame #3 (i.e., subframe #14 of radio frame #2) by addition of 5 to the number of subframe #9.

Meanwhile, to increase resource utilization of a subframe, the UL/DL configuration needs to be changed momentarily. Momentary change of the UL/DL configuration is referred to as dynamic uplink/downlink configuration.

Additionally, in the FDD system, changing the uplink/downlink configuration of a subframe through band swapping may also be considered in addition to change to UL or DL of the UL/DL configuration of the subframe through the dynamic uplink/downlink configuration. Band swapping means temporarily using a frequency assigned to UL for DL, or vice versa. Hereinafter, a description will be given of dynamic UL/DL configuration for the FDD system, but it is apparent that the description covers the case in which the UL/DL configuration is changed by band swapping.

In the dynamic uplink/downlink configuration environment, the UL/DL subframe is changed based on the radio frame unit, and accordingly an allocation rule for various transmission channels such as PUSCH, PHICH or PDCCH needs to be redefined. If such transmission rule is not redefined, resource utilization may be degraded by the dynamic uplink/downlink configuration used to increase resource utilization.

Further, in the aforementioned subframe bundling transmission mode, channel allocation is not defined in the dynamic uplink/downlink configuration. Accordingly, an operational error and/or degradation of resource utilization may be caused between the BS and the UE. To address this problem, it is necessary to redefine the allocation rule for transmission channels such as PUSCH, PHICH and PDCCH, which are related to subframe bundling transmission mode using PUSCH. Accordingly, embodiments of the present invention propose a method for redefining an allocation rule for transmission channels.

Redefining an Allocation Rule for PUSCH and PDCCH

According to one embodiment of the present invention, in the FDD and TDD systems, if the UL/DL configuration for a subframe used for subframe bundling transmission is changed by the dynamic DL-UL configuration, four subsequent UL subframes may be used in a bundle for the subframe bundling transmission mode. Since the BS controls transmission of subframe bundling to the UE and the UL/DL configuration for the UE through, for example, higher layer signaling, the BS may know subframes to be bundled. Accordingly, the BS may know subframes in which UL data is to be consecutively received according to the same UL grant. Specific examples of this method will be described with reference to FIG. 15 for the FDD system and with reference to FIG. 15 for the TDD system.

Figure 14:
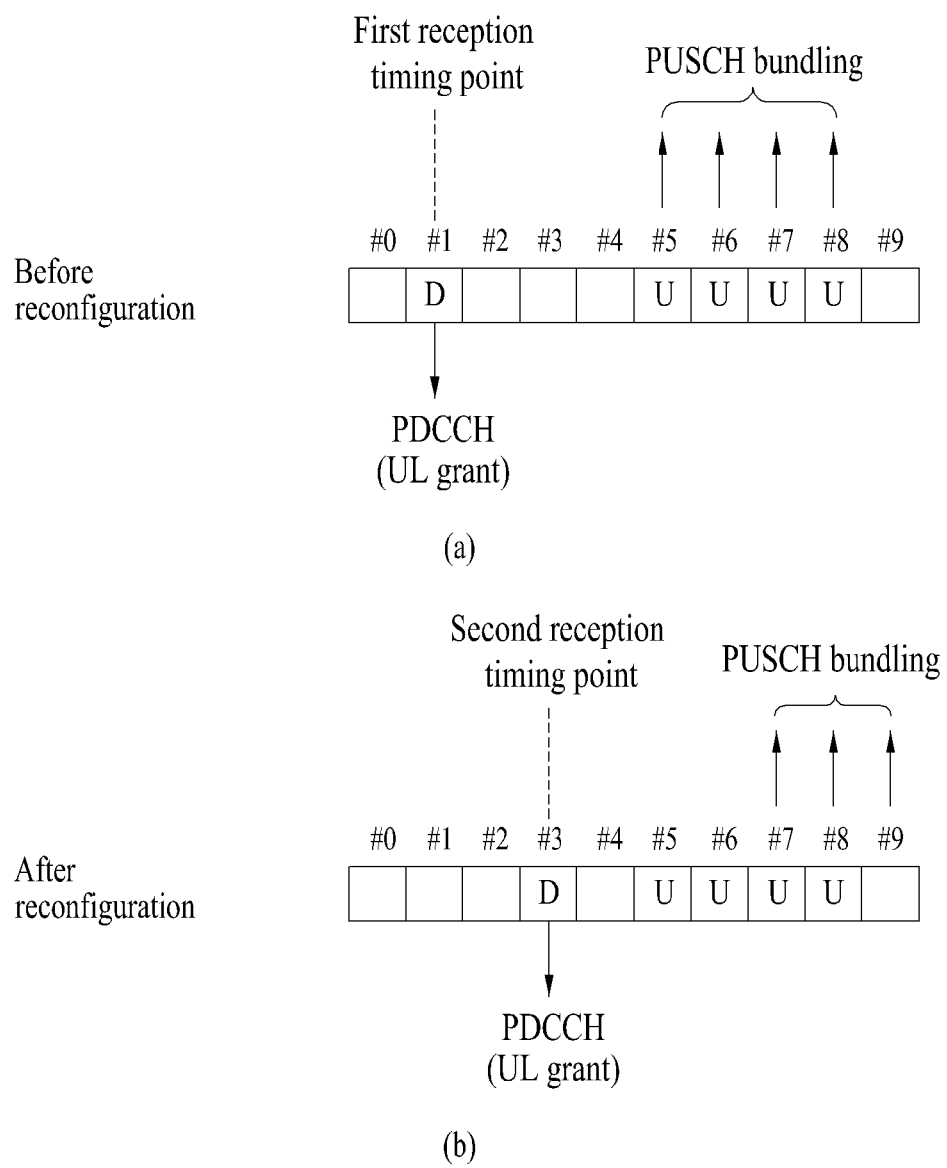
FIG. 14 illustrates an exemplary method for redefining an allocation rule for transmission channels of PDCCH and PUSCH in an FDD system according to one embodiment of the present invention.

FIG. 14 illustrates an exemplary method for redefining an allocation rule for transmission channels of PDCCH and PUSCH in an FDD system according to one embodiment of the present invention.

FIG. 14(a) illustrates the subframe configuration prior to dynamic UL/DL configuration, and FIG. 14(b) illustrates the subframe configuration after dynamic UL/DL configuration. As discussed above with reference to FIG. 10, if the UL grant is received in subframe n in the FDD system, the first subframe of the subframe bundling transmission for the received UL grant is subframe n+4. Accordingly, as shown in FIG. 14 (a), if the UL grant is received in a subframe whose subframe number is 1, the first subframe of the subframe bundling transmission begins with subframe #5 whose subframe number is greater by 4 than that of subframe #1.

FIG. 14 (b) illustrates the subframe configuration after dynamic UL/DL configuration. In this example, the configurations of subframes #5 and #6 have changed from UL to DL among the subframe configurations of FIG. 14 (a). As described above, the UE may use four UL subframes following subframe #6 together in the subframe bundling transmission mode.

Accordingly, the first subframe of the subframe bundling transmission may begin not with subframe #5, but with subframe #7. If the start subframe of subframe bundling transmission is changed from subframe #5 to subframe #7 by the dynamic UL/DL configuration, the position of the UL grant is also changed from a first reception timing point of FIG. 14(a) to the second reception timing point of FIG. 14(b). According to one embodiment of the present invention, if a subframe used for subframe bundling transmission is changed by the dynamic UL/DL configuration as above, the present invention proposes that the first reception timing point at which the UL grant is received prior to the reconfiguration and the second reception timing point at which the UL grant is received after the reconfiguration be determined and that decoding be performed at both reception timing points.

As a corresponding operation, when the BS determines a timing point at which the UL grant is transmitted to the UE, it may select at least one of a timing point (a first transmission timing point) prior to change of the subframe configuration and a timing point (a second transmission timing point) after the reconfiguration and transmit the UL grant.

In determining at least one of the first transmission timing point and the second transmission timing point, the BS may consider a communication environment of a current wireless communication system. Herein, the communication environment may include the quality state of a currently connected network, data transmission/reception speed, and/or the number of other UEs sharing the same power resource. That is, one embodiment illustrated in FIG. 14 proposes that the UE perform blind detection both in subframe #1, which is the first timing point, and subframe #3, which is the second timing point if the position of a subframe of the subframe bundling transmission is changed from the state of FIG. 14(a) to the state of FIG. 14(b) by the dynamic UL/DL configuration.

If the UE detects the UL grant at one of the two timing points, the UE may perform subframe bundling transmission through a PUSCH based on the detected UL grant.

According to one embodiment of the present invention, if the UE detects the UL grants at both timing points, it may perform subframe bundling transmission through the PUSCH based on one of the detected UL grants which is later in time.

The example of FIG. 14 is one embodiment of the present invention for the FDD system. Hereinafter, another embodiment of the present invention for the TDD system will be described with reference to FIG. 15.

FIG. 15 illustrates an exemplary method for redefining an allocation rule for transmission channels of PDCCH and PUSCH in a TDD system according to one embodiment of the present invention. FIG. 15(a) illustrates the subframe configuration prior to the dynamic UL/DL configuration, and FIG. 15(b) illustrates the subframe configuration after the dynamic UL/DL configuration. In the example of FIG. 15, the DL-UL configuration of the TDD system is 6, and the configuration of subframe #7 of radio frame #1 is changed from a UL subframe to a DL subframe by the dynamic UL/DL configuration.

Referring to FIG. 15(a), the number n of the first subframe for subframe bundling transmission is 7. It can be seen from FIG. 7 that, if the DL-UL configuration is 6, a UL grant is received in subframe #0.

As UL subframe #7 changes to a DL subframe, the position of a subframe used for the subframe bundling transmission also changes. That is, if the UL/DL configuration of at least one of a predetermined number of consecutive subframes changes from UL to DL, the position of the subframe of the transmitted UL signal may be changed to the closest one of the subsequent UL subframes by the number of the changed subframes.

In FIG. 15, the position of the subframe bundling transmission may be changed to subframe #4 of radio frame #2, which is the closest subframe of the subframes subsequent to the subframe which is used for subframe bundling transmission. By changing the subframe used for subframe bundling transmission, the number of the most leading one of the subframes used for the subframe bundling transmission has changed from 7 to 8.

According to one embodiment of the present invention, if the number of the changed subframe is n' according to change in position of the subframe used for subframe bundling transmission by the dynamic UL/DL configuration, the BS may redefine the reception timing point of a UL grant based on whether or not the value of $k_{PDCCH}$ is defined for subframe n' in Table 7. That is, the UE determines the reception timing point of a UL grant based on whether or not the value of $k_{PDCCH}$ is defined for subframe n' in Table 7.

First, if the value of $k_{PDCCH}$ is defined for subframe n' in Table 7, the UE may determine subframe n'-$k_{PDCCH}$ as the reception timing point of the UL grant.

For example, if the DL-UL configuration is 6, n' is changed to #1 by change of the subframe used for the subframe bundling transmission, Table 7 confirms that the value of $k_{PDCCH}$ is 7. In this case, the UE may determine subframe #4 of the last radio frame corresponding to n'-$k_{PDCCH}$ as the reception timing point of the UL grant.

If the value of $k_{PDCCH}$ is not defined for subframe n' in Table 7, the UE determines a third reception timing point of the UL grant based on subframe n prior to reconfiguration, and determines a fourth reception timing point of the UL grant based on subframe n' after the change. Then, the UE determines the most leading DL subframe of the DL subframes present within the third reception timing point and the fourth reception timing point.

The case in which the value of $k_{PDCCH}$ is not defined in Table 7 may correspond to the example of FIG. 15(b). It can be seen from FIG. 15(b) that the value of n' is 8 according to change of the subframe used for subframe bundling transmission. Referring to Table 7, the value of $k_{PDCCH}$ is not defined for subframe #8. As the value of $k_{PDCCH}$ is not defined, the UE cannot determine the reception subframe for UL grant (the reception subframe for the UL grant can be determined to be subframe n-$k_{PDCCH}$ only when $k_{PDCCH}$ is determined).

Regarding the third reception timing point, when the reception timing point of the UL grant is determined based on subframe #7, which is subframe n prior to reconfiguration, the UE may determine that the UL grant is received in subframe #0.

The UE determines the fourth reception timing point based on subframe #8, for which n' is #8 after change to the dynamic UL/DL configuration. At this time, the UE may determine subframe n'−4 corresponding to subframe #4 as the fourth reception timing point of UL grant. In addition, the UE may confirm that DL subframes of the subframes within the third reception timing point and the fourth reception timing point are subframes #0 and #1. Lastly, the UE may determine that subframe #0 which is the leading subframe of the two subframes is the reception subframe of the UL grant.

A method for redefining PDCCH for a UL grant signal in relation to subframe bundling transmission through PUSCH has been discussed above with reference to FIGS. 14 and 15. Hereinafter, a method for redefining the PHICH for an ACK/NACK signal in relation to the subframe bundling transmission will be described with reference to FIGS. 16 and 17.

Redefining PUSCH and PHICH

FIG. 16 illustrates an exemplary method for redefining an allocation rule for transmission channels of PUSCH and PHICH in an FDD system according to one embodiment of the present invention. FIG. 16(a) shows the subframe configuration prior to the dynamic UL/DL configuration, and FIG. 16(b) shows the subframe configuration after dynamic UL/DL configuration.

Referring to FIG. 16(a), subframes #1 to #4 are used for the subframe bundling transmission prior to the dynamic UL/DL configuration. If the last subframe for the subframe bundling transmission is subframe m, the UE may determine that subframe m+4 is the timing point of reception of an ACK/NACK signal through the PHICH according to subframe bundling transmission.

That is, if m is #4 as in the example of FIG. 16(a), the UE may receive the ACK/NACK signal in subframe #8 for m+4.

FIG. 16(b) illustrates a case in which the configuration of subframe #1 is changed from UL to DL by the dynamic UL/DL configuration. As described above, when the configuration of a subframe used for subframe bundling transmission is changed to DL, four subsequent UL subframes are used for the subframe bundling transmission. Since subframe #1 is changed from UL to DL in the illustrated case, the UE may use subframes #2 to #5 subsequent to subframe #1 for the subframe bundling transmission.

In this case, if the number of the last subframe for the subframe bundling transmission is m', the UE may determine that subframe m'+4 is the reception timing point for ACK/NACK through the PHICH. That is, if m' is #5 as in the example of FIG. 16 (b), the UE may receive an ACK/NACK signal in subframe #9 corresponding to m'+4.

FIG. 17 illustrates an exemplary method for redefining an allocation rule for transmission channels of PUSCH and PHICH in a TDD system according to one embodiment of the present invention. FIG. 17(a) shows the subframe configuration prior to dynamic UL/DL configuration, and FIG. 17(b) shows the subframe configuration after dynamic UL/DL configuration.

Referring to FIG. 17(a), subframes #2 to #4 and #7 are used for the subframe bundling transmission before dynamic UL/DL configuration. The UE determines the reception timing point of an ACK/NACK signal based on the last subframe of the subframes used for subframe bundling transmission. Therefore, if the determination is performed based on subframe #7 which is the last of the subframes used for subframe bundling transmission, the UE may determine that the reception timing point of an ACK/NACK signal corresponding to the subframe bundling transmission is subframe #1 of radio frame #2.

FIG. 17(b) illustrates a case in which the configuration of subframe #5 of radio frame #1 in the state of FIG. 17(a) is changed from DL to UL by the dynamic UL/DL configuration.

According to one embodiment of the present invention, if the configuration of a UL subframe present among the UL subframes used for subframe bundling transmission is changed from DL to UL by the dynamic UL/DL configuration, the changed UL subframe may be used in the subframe bundling transmission mode.

An example will be described below with reference to FIG. 17. The configuration of DL subframe #5 present among subframes #2, #3, #4 and #7 is changed to UL by the dynamic UL/DL configuration when subframes #2, #3, #4 and #7 are being used for the subframe bundling transmission. Then, the UE may use subframe #5 which is changed to UL in place of subframe #7 which was used for the subframe bundling transmission mode. Referring to FIG. 17(b), subframes #2 to #5 are used for the subframe bundling transmission mode.

As the position of the subframes used for the subframe bundling transmission mode is changed as in FIG. 17(b), the number of the last subframe used for the subframe bundling transmission mode may be changed from m=#7 to m'=#5.

When the number of the last subframe of the subframes used for the subframe bundling transmission mode is changed to m' by the dynamic UL/DL configuration, the UE according to one embodiment of the present invention may determine the reception timing point of an ACK/NACK signal according to whether or not $k_{PHICH}$ for m' is defined in Table 5.

First, if the value of $k_{PHICH}$ for subframe m' is defined in Table 6, the UE may receive an ACK/NACK signal for the subframe bundling transmission mode in subframe $m'+k_{PHICH}$.

In this case, if the DL-UL configuration is 6 and the number m' of the changed subframe is 4, the value of $k_{PHICH}$ is 6 according to Table 5. Accordingly, the UE receives an ACK/NACK signal for the subframe bundling transmission mode in subframe #10, which is #4+6, (i.e. subframe #0 of the next radio frame.

If the value of $k_{PHICH}$ for subframe m' is not defined in Table 6, the UE may determine a fifth reception timing point based on the subframe m, which is the subframe prior to the change, and determine a sixth reception timing point based on the subframe m', which is the subframe after change. Then, the UE may receive the ACK/NACK signal in a subframe for the earlier one of the fifth reception timing point and sixth reception timing point.

This case is illustrated in FIG. 17 (b). Referring to FIG. 17 (b) the number of the last subframe for the subframe bundling transmission mode has been changed to #5 by the dynamic UL/DL configuration. Referring to Table 5, for subframe #5, the value of $k_{PHICH}$ is not defined. Accordingly, in this case, the UE may determine the fifth reception timing point and the sixth reception timing point, and receive an ACK/NACK signal in the subframe of the earlier one of the fifth reception timing point and the sixth reception timing point.

The UE may determine the fifth reception timing point based on m, which is the subframe number prior to the change. According to Table 5, DL-UL configuration is 6, and the value of $k_{PHICH}$ for #7 which is the subframe number prior to change is determined to be 4. Therefore, the UE may determine that subframe #11 corresponding to #7+$k_{PHICH}$ (i.e., subframe #1 of the next radio frame) is the fifth reception timing point (see FIG. 17(a)).

The UE may determine the sixth reception timing point based on m', which is the subframe number after change. According to one embodiment of the present invention, the UE may determine that the sixth reception timing point is a subframe whose number is m' plus a predetermined value. For example, the UE may determine that the sixth reception timing point is subframe m'+4.

Lastly, the UE may receive an ACK/NACK signal in subframe #9, which is the earlier one of subframe #11 (subframe #1 of radio frame #2, the next subframe) which the fifth reception timing point and subframe m'+4 (subframe #9 of radio frame #1) which is the sixth reception timing point.

According to another embodiment of the present invention, even if the configuration of a DL subframe present between the UL subframes used for the subframe bundling transmission is changed from DL to UL by the dynamic UL/DL configuration as illustrated in FIG. 17, the UL subframe resulting from the change may not be used for the subframe bundling transmission mode. That is, while FIG. 17 illustrates an embodiment in which the position of the UL subframes used for the subframe bundling transmission by the dynamic UL/DL configuration is changed, the embodiment which will be discussed below with reference to FIG. 18 proposes that the UE not change the UL subframes used for subframe bundling transmission.

FIG. 18 illustrates another exemplary method for redefining an allocation rule for transmission channels of PUSCH and PHICH in a TDD system according to one embodiment of the present invention. FIG. 18(a) shows the subframe configuration prior to dynamic UL/DL configuration, and FIG. 18(b) shows the subframe configuration after dynamic UL/DL configuration.

Referring to FIG. 18(a), subframes #2 to #4 and #7 are used for subframe bundling transmission before dynamic UL/DL configuration, as in the example of FIG. 17 (a). If the determination is performed based on subframe #7 which is the last of the subframes used for the subframe bundling transmission, the UE may receive an ACK/NACK signal corresponding to the subframe bundling transmission in subframe #1 of radio frame #2.

FIG. 18(b) illustrates a case in which the configuration of subframe #5 of radio frame #1 in the state of FIG. 18(a) is changed from DL to UL by the dynamic UL/DL configuration.

Unlike the example of FIG. 17 (b) in which subframe #5 changed from DL to UL is used in the subframe bundling transmission mode, subframe #5 is not used in the example of FIG. 18 (b). Accordingly, subframe #7, which is the last subframe used in the subframe bundling mode prior to change of the configuration thereof, may still be used as the last subframe for the subframe bundling mode even after change of the configuration.

That is, even if the configuration of the subframe is changed by the dynamic UL/DL configuration, the position of the subframes used in the subframe bundling transmission mode does not change. Thereby, the subframe for reception of the ACK/NACK signal through the existing PHICH or for reception of a UL grant through a PDCCH may not change. Therefore, according to the embodiment illustrated in FIG. 18, the UE may advantageously use the reception position that is previously determined. In the example of FIG. 18, the configuration of the subframes is changed from DL to UL by the dynamic UL/DL configuration. This example may also be applied in a case in which the configuration is changed from UL to DL.

For example, suppose that the configuration of subframe #4 of radio frame #1 in the state of FIG. 18 (a) has been changed from UL to DL by the dynamic UL/DL configuration. In this case, the present invention proposes that the reception timing point of an ACK/NACK signal and the timing point of reception of a UL grant through the PDCCH not change. To this end, if the configuration of the subframes used for subframe bundling transmission is changed from UL to DL, the UE does not perform transmission in the changed subframe, nor does it perform additional transmission in the other UL subframes. That is, the UE maintains the reception timing point of the ACK/NACK signal or the timeline of the PDCCH by reducing the number of subframes used for subframe bundling transmission.

According to another embodiment of the present invention, the UE may perform bundling transmission only in the subframes whose configuration is unchangeable, other than the subframes whose configuration is changeable by the dynamic UL/DL configuration.

That is, both the BS and the UE know the subframes changeable to UL/DL as predefined, and perform bundling transmission only in subframes whose configuration is not changeable, excluding those changeable subframes from the bundling operation. This is the case of change from the state of FIG. 17(a) to the state of FIG. 17(b). Although bundling transmission is made possible by change of the configuration of subframe #5 from DL to UL, the UE does not use subframe #5, but use subframes #2, #3, #4 and #7 in the subframe bundling transmission mode.

Quick Termination of the Subframe Bundling Transmission Mode

In a method for defining channel allocation according to another embodiment of the present invention, if transmission has been successfully performed in one of the subframes used in the bundling transmission mode, transmission through an additional PUSCH is not performed.

The subframe bundling transmission mode is used to increase reliability between the BS and the UE when the channel condition is poor. In this case, one subframe bundling transmission includes four UL subframes, and each of the subframes is identical to transmission in the normal transmission mode. Accordingly, if one of the subframes in the subframe bundling transmission mode is normally received, the need for information transmitted through the other subframes is eliminated. In this case, stopping transmission through the other subframes and using the resource for another purpose is efficient.

Therefore, according to an embodiment of the present invention described below, if transmission has been successfully performed by one of the subframes used in the subframe bundling transmission mode, transmission of the same signal is not performed through an additional PUSCH. Alternatively, if transmission has been successfully performed by one subframe used in the subframe bundling transmission mode, the reception timing point of an ACK/NACK signal may be determined based on this subframe. Hereinafter, this embodiment will be described in detail with reference to FIGS. 19 and 20.

FIG. 19 illustrates examples of a method for defining a response channel for a subframe bundling transmission mode in an FDD system. FIG. 19(a) illustrates a first example of the method for defining a response channel, and FIG. 19(b) illustrates a second example of the method for defining a response channel. In both examples of FIGS. 19(a) and 19(b), a PUSCH is transmitted in subframes #1 to

4 using the subframe bundling transmission mode and transmission in subframe #2, which is the second transmission to the BS, is successful.

In this embodiment, the BS transmits an ACK/NACK signal (or a UL grant signal) in response, based on subframe m corresponding to subframe #2 in which transmission is successful.

In the first example of FIG. 19(a), as the PUSCH is successfully transmitted in subframe #2, the BS may transmit an ACK/NACK in subframe #6, which is subframe #2+4 with respect to signal subframe #2.

Further, this embodiment may enhance resource utilization by transmitting a UL grant signal without transmission of an ACK/NACK signal. That is, the BS may transmit a UL grant in a subframe corresponding to the transmission timing point of the ACK/NACK signal, as in the second example of 17(b). When a UL grant signal is used in place of an ACK/NACK signal, the UE may check the NDI field (New Data Indicator field) of the PDCCH. Thereby, the UE may determine ACK if the value of the field is different from the previously received value of the field (i.e., "toggled"), and may determine NACK if the value is the same as the previously received value (i.t., "not toggled").

Accordingly, the UE having received a UL grant signal and a toggled NDI field in place of an ACK signal may confirm that the PUSCH has been normally transmitted, and perform the next subframe bundling transmission through the PUSCH. If the UL grant signal is received in place of the ACK signal as above, resource utilization may be more enhanced than in the first example in which a UL grant needs to be received after an ACK signal. This is because delay until the "retransmission"/"new transmission" is performed may be reduced, and in some cases, a UL subframe of the subframes used for subframe bundling transmission may be utilized for another purpose.

While FIG. 19 illustrates examples applied to an FDD system, the same concept can also be applied to a TDD system, which will be described with reference to FIG. 20.

Figure 20:
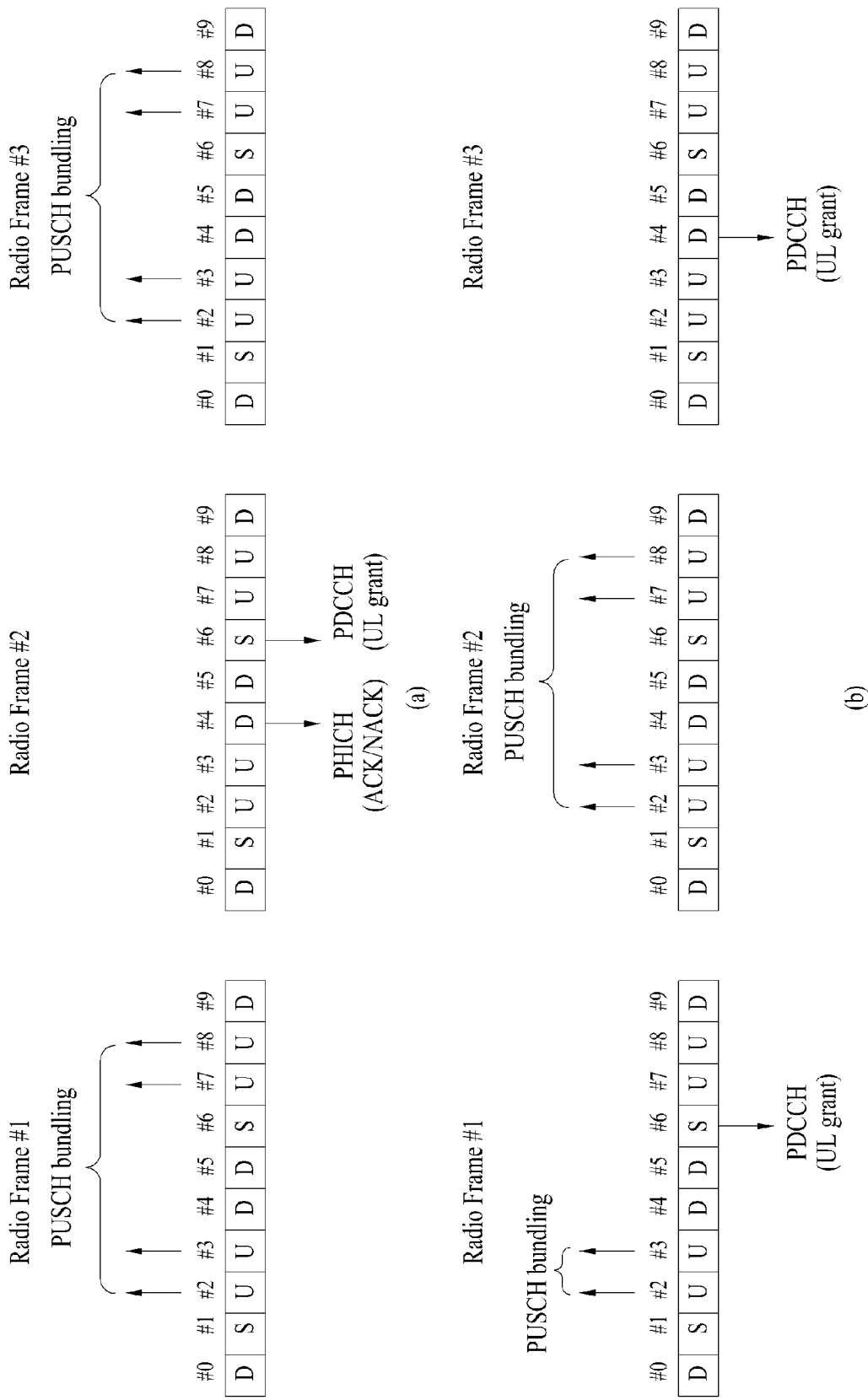
FIG. 20 illustrates examples of a method for defining a response channel for a subframe bundling transmission mode in a TDD system.

FIG. 20 illustrates examples of a method for defining a response channel for a subframe bundling transmission mode in a TDD system. In the TDD system according to this embodiment of the present invention, the UE does not perform transmission through an additional PUSCH if transmission has been successfully performed in one of the subframes used in the subframe bundling transmission mode.

Since configuration of subframes is divided in terms of time in the TDD system, this embodiment may be applicable to the following situations.

(1) The first subframe for the PUSCH subframe bundling transmission is #1, #4, #7, and #9 with the DL-UL configuration set to 0.

(2) All PUSCH subframe bundling transmission is performed with the DL-UL configuration set to 1.

(3) The numbers of the first subframes for PUSCH subframe bundling transmission are #2, #4, and #7 with the DL-UL configuration set to 6.

FIG. 20(a) illustrates a typical method of channel allocation for PUSCH, PHICH and PDCCH according to Tables 5 to 7. Referring to FIG. 20(a), two subframe bundling transmissions are performed. the subframes used for the first subframe bundling transmission are subframes #2, #3, #7 and #8 of radio frame #1, and the subframes used for the second subframe bundling transmission are subframe #2, #3, #7 and #8 of radio frame #3. In addition, an ACK/NACK signal is received in subframe #4 of radio frame #2 in response to the first subframe bundling transmission. A UL grant signal is received in subframe #6 of radio frame #2 in response to the second subframe bundling transmission.

FIG. 20(b) illustrates an example of application of a method for defining a response channel according to one embodiment of the present invention. In the example of FIG. 20(b), it is assumed that transmission is performed in subframes #2 and #3 through subframe bundling transmission and that the PUSCH transmitted in subframe #3 has been normally transmitted to the BS.

Accordingly, the BS transmits an ACK/NACK signal (or a UL grant signal in place of the ACK/NACK signal) in response, based on the position of subframe # in which the subframe bundling transmission has been normally performed.

Particularly, in FIG. 20(b), a UL grant is transmitted in place of an ACK/NACK signal in response to the subframe bundling transmission, which is intended to enhance resource use efficiency, as described above based on FDD in FIG. 19.

The UE has been scheduled to perform the remaining transmission through the subframe bundling transmission in subframes #7 and #8. However, as a UL grant is received in subframe #6, the UE may subsequently perform the next subframe bundling transmission without performing the remaining subframe bundling transmission.

In determining a transmission timing point for an ACK/NACK signal (or a UL signal in place of the ACK/NACK signal) for the subframe bundling transmission, the BS performs the determination based on subframe #3 in which transmission has been normally performed. If a reception timing point of the ACK/NACK signal (or the UL grant in place of the ACK/NACK signal) is determined based on subframe #3, the BS transmits the UL grant in subframe #6. Therefore, the UE may in turn determine the timing point of the second subframe bundling transmission based on the UL grant received in subframe #6. In addition, the UE may determine that the start timing point of the second subframe bundling transmission is subframe #2 of radio frame #2, as shown in FIG. 20 (b).

Accordingly, it can be seen from comparison between the example of FIG. 20(a), which is not based on definition of the response channel of the present invention, and the example of FIG. 20(b), which is based on the definition of the response channel of the present invention, that two subframe bundling transmissions have been performed for three radio frames in the example of FIG. 20 (a), while two subframe bundling transmissions have been performed for two radio frames in the example of FIG. 20 (b). Therefore, according to the illustrated embodiment of the present invention, more information may be efficiently transmitted using a reduced amount of resources.

The detailed description of preferred embodiments of the present invention has been given above to allow those skilled in the art to implement and practice the invention. It will be apparent to those skilled in the art that various modifications and variations can be made in the present invention without departing from the spirit or scope of the invention. Thus, it is intended that the present invention is not limited to the embodiments described herein, but covers all modifications and variations of this invention provided they are consistent with the principles and novel features disclosed herein.

INDUSTRIAL APPLICABILITY

Embodiments of the present invention may be used for a base station, a user equipment and other devices in a wireless communication system.

The invention claimed is:

1. A method for transmitting uplink data using subframe bundling of transmitting an uplink signal in a predetermined number of subframes by a user equipment in a wireless communication system, the method comprising:
   determining a first reception timing point of an uplink grant for the uplink data based on a subframe (hereinafter, a first subframe) for application of the subframe bundling according to an uplink-downlink configuration;
   changing the subframe for application of the subframe bundling according to an uplink-downlink reconfiguration;
   determining a second reception timing point of the uplink grant for the uplink data based on the changed subframe (hereinafter, a second subframe); and
   attempting to decode the uplink grant for the subframes at the first reception timing point and the second reception timing point, when the subframe for application of the subframe bundling is changed from the first subframe to the second subframe due to the uplink-downlink reconfiguration,
   when decoding of the uplink grant is successful at both the first reception timing point and the second reception timing point, the uplink data is transmitted based on the uplink grant of earlier one of the first reception timing point and the second reception timing point, using the subframe bundling.

2. The method according to claim 1, wherein the first subframe is a leading subframe of consecutive subframes for application of the subframe bundling before the uplink-downlink reconfiguration, and the second subframe is a leading subframe of consecutive subframes for the subframe bundling after the uplink-downlink reconfiguration, wherein a subframe positioned ahead of the first subframe by a first value is determined to be the first reception timing point, and a subframe positioned ahead of the second subframe by a second value is determined to be the second reception timing point.

3. The method according to claim 1, further comprising:
   determining a third reception timing point of a response signal to the uplink data based on the first subframe; and
   determining a fourth reception timing point of the response signal to the uplink data based on the second subframe,
   wherein the response signal to the uplink data is received in a subframe of earlier one of the third and fourth reception timing points.

4. The method according to claim 3, wherein the first subframe is a last subframe of consecutive subframes for application of the subframe bundling before the uplink-downlink reconfiguration, and the second subframe is a last subframe of consecutive subframes for application of the subframe bundling after the uplink-downlink reconfiguration,
   wherein a subframe positioned behind the first subframe by a third value is determined to be the third reception timing point, and a subframe positioned behind the second subframe by a fourth value is determined to be the fourth reception timing point.

5. The method according to claim 1, wherein, when a configuration of at least one subframe of consecutive subframes for application of the subframe bundling before the uplink-downlink reconfiguration is changed from uplink to downlink by the uplink-downlink reconfiguration, the subframe bundling is applied to uplink subframes subsequent to the changed subframe, a number of the subsequent uplink subframes being a number of the changed subframe.

6. The method according to claim 1, further comprising:
   attempting to decode the uplink grant for a subframe present between the first reception timing point and the second reception timing point.

7. The method according to claim 6, wherein, when decoding of the uplink grant is successful in plural ones of the subframes, the uplink data is transmitted based on the successfully decoded uplink grant of earliest one of the timing points, using the subframe bundling.

8. A user equipment for transmitting uplink data using subframe bundling of transmitting an uplink signal in a predetermined number of subframes in a wireless communication system, the user equipment comprising:
   a radio frequency (RF) unit; and
   a processor configured to control the RF unit,
   wherein the processor determines a first reception timing point of an uplink grant for the uplink data based on a subframe for application of the subframe bundling according to uplink-downlink configuration, changes the subframe for application of the subframe bundling according to uplink-downlink reconfiguration, determines a second reception timing point of the uplink grant for the uplink data based on the changed subframe (hereinafter, a second subframe), and attempts to decode the uplink grant for the subframes at the first reception timing point and the second reception timing point, when the subframe for application of the subframe bundling is changed from the first subframe to the second subframe due to the uplink-downlink reconfiguration,
   when decoding of the uplink grant is successful at both the first reception timing point and the second reception timing point, the processor transmits the uplink data based on the uplink grant of earlier one of the first reception timing point and the second reception timing point, using the subframe bundling.

9. The user equipment according to claim 8, wherein the first subframe is a leading subframe of consecutive subframes for application of the subframe bundling before the uplink-downlink reconfiguration, and the second subframe is a leading subframe of consecutive subframes for application of the subframe bundling after the uplink-downlink reconfiguration,
   wherein the processor determines that a subframe positioned ahead of the first subframe by a first value is the first reception timing point and that a subframe positioned ahead of the second subframe by a second value is the second reception timing point.

10. The user equipment according to claim 8, wherein the processor:
    determines a third reception timing point of a response signal to the uplink data based on the first subframe; and
    determines a fourth reception timing point of the response signal to the uplink data based on the second subframe,
    wherein the response signal to the uplink data is received in a subframe of earlier one of the third and fourth reception timing points.

11. The user equipment according to claim 8, wherein, when a configuration of at least one subframe of consecutive subframes for application of the subframe bundling before the uplink-downlink reconfiguration is changed from uplink to downlink by the uplink-downlink reconfiguration, the processor applies the subframe bundling to uplink subframes subsequent to the changed subframe, a number of the subsequent uplink subframes being a number of the changed subframe.

12. The user equipment according to claim 8, wherein the first subframe is a last subframe of consecutive subframes for application of the subframe bundling before the uplink-downlink reconfiguration, and the second subframe is a last subframe of consecutive subframes for application of the subframe bundling after the uplink-downlink reconfiguration,
wherein the processor determines that a subframe positioned behind the first subframe by a third value is the third reception timing point and that a subframe positioned behind the second subframe by a fourth value is the fourth reception timing point.

13. The user equipment according to claim 8, wherein the processor further attempts to decode the uplink grant for a subframe present between the first reception timing point and the second reception timing point.

14. The user equipment according to claim 13, wherein, when decoding of the uplink grant is successful in plural ones of the subframes, the processor transmits the uplink data based on the successfully decoded uplink grant of earliest one of the timing points, using the subframe bundling.

15. A base station for receiving uplink data using subframe bundling of receiving an uplink signal from a user equipment in a predetermined number of subframes in a wireless communication system, the base station being configured to:

determine a first transmission timing point of an uplink gran for the uplink data based on a subframe (hereinafter, a first subframe) for application of the subframe bundling according to an uplink-downlink configuration;

change the subframe for application of the subframe bundling according to uplink-downlink reconfiguration;

determine a second transmission timing point of the uplink grant for the uplink data based on the changed subframe (hereinafter, a second subframe); and transmit the uplink grant at least one of the first and second transmission timing point based on a communication environment of the wireless communication system, when decoding of the uplink grant is successful at both a first reception timing point corresponding to the first transmission timing point and a second reception timing point corresponding to the second transmission timing point, the processor receives the uplink data based on the uplink grant of earlier one of the first reception timing point and the second reception timing point, using the subframe bundling, in case the first reception timing point and the second reception timing point has been changed due to the uplink-downlink reconfiguration.

* * * * *